(12) United States Patent
Kubo et al.

(10) Patent No.: US 8,103,317 B2
(45) Date of Patent: Jan. 24, 2012

(54) COMMUNICATION SYSTEM AND COMMUNICATION METHOD

(75) Inventors: Hiroaki Kubo, Muko (JP); Kenji Matsuhara, Kawanishi (JP); Nobuhiro Mishima, Osaka (JP); Kazuo Inui, Itami (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 793 days.

(21) Appl. No.: 12/028,522

(22) Filed: Feb. 8, 2008

(65) Prior Publication Data

US 2008/0200118 A1 Aug. 21, 2008

(30) Foreign Application Priority Data

Feb. 16, 2007 (JP) ................. 2007-037201

(51) Int. Cl.
*H04M 1/00* (2006.01)

(52) U.S. Cl. ........... 455/574; 455/550.1; 455/69; 455/9; 455/10; 455/11.1

(58) Field of Classification Search ....... 455/332.1–445, 455/550.1, 69, 9, 10, 11.1, 574
See application file for complete search history.

(56) References Cited

U.S. PATENT DOCUMENTS 7,366,149 B2  4/2008  Maki et al.

2004/0095916 A1*  5/2004  Maki et al. ............. 370/338

FOREIGN PATENT DOCUMENTS

| JP | 2000-050035 A | 2/2000 |
| JP | 2001-285946   | 10/2001 |
| JP | 2002-236572 A | 8/2002 |
| JP | 2004-040449 A | 2/2004 |
| JP | 2004-165737 A | 6/2004 |
| JP | 2004-187133   | 7/2004 |

OTHER PUBLICATIONS

Decision to Grant a Patent in JP 2007-037201 dated Dec. 24, 2008, and an English Translation thereof.

* cited by examiner

*Primary Examiner* — Fayyaz Alam

(74) *Attorney, Agent, or Firm* — Buchanan Ingersoll & Rooney PC

(57) ABSTRACT

A communication system and a communication method for permitting a user of a cell-phone to receive data in a non-service area via an MFP. When the communication condition between a base station and a cell-phone becomes bad, the base station sends a map showing the current position of the cell-phone and the locations of nearby MFPs to the cell-phone. The user of the cell-phone selects one from the MFPs on the map and notifies the base station of the selected MFP. The base station sends an e-mail addressed to the cell-phone to the selected MFP, and the MFP stores the e-mail therein. The user of the cell-phone makes an access to the MFP by short-distance wireless communication to receive the e-mail.

14 Claims, 27 Drawing Sheets

FIG. 5

| E-MAIL ADDRESS | CURRENT POSITION | CONDITION | ID No. |
|---|---|---|---|
| a@A.ne.jp | 135° 20' 15", 35° 21' 20" | 1 | 1234 |
| b@B.ne.jp | 139° 25' 42", 38° 52' 26" | 0 | 5678 |
| c@C.ne.jp | 132° 19' 05", 35° 43' 41" | 2 | 9876 |
| d@A.ne.jp | 136° 40' 33", 34° 11' 18" | 3 | 3214 |

FIG. 6

| MFP NAME | LOCATION | IP ADDRESS | STORE |
|---|---|---|---|
| 1st MFP | 135° 23' 18", 35° 24' 30" | 192.168.10 | STORE A |
| 2nd MFP | 135° 18' 02", 35° 19' 05" | 192.168.20 | STORE B |
| 3rd MFP | 132° 25' 09", 34° 22' 33" | 192.168.30 | STORE C |
| 4th MFP | 136° 52' 19", 37° 12' 36" | 192.168.40 | STORE D |

FIG. 7

| E-MAIL ADDRESS | TITLE | TRANSFER DESTINATION |
|---|---|---|
| a@A.ne.jp | CONFERENCE | 1st MFP |
| b@B.ne.jp | HELLO | 2nd MFP |
| c@C.ne.jp | MEETING | 1st MFP |
| d@A.ne.jp | THANK YOU | 4th MFP |

FIG. 8

| E-MAIL ADDRESS | TITLE 1 | TITLE 2 | TITLE 3 |
|---|---|---|---|
| a@A.ne.jp | CONFERENCE | — | — |
| b@B.ne.jp | HELLO | — | — |
| c@C.ne.jp | MEETING | — | — |
| d@A.ne.jp | THANK YOU | — | — |

FIG. 16

| E-MAIL ADDRESS | TRANSFER TERM | TRANSFER DESTINATION |
|---|---|---|
| a@A.ne.jp | 2007/1/1~2007/1/7 | 1st MFP |
| b@B.ne.jp | 2007/2/5~2007/2/14 | 2nd MFP |
| c@C.ne.jp | 2007/2/6~2007/2/9 | 1st MFP |
| d@A.ne.jp | 2007/2/21~2007/2/28 | 4th MFP |

FIG. 17

| E-MAIL ADDRESS | TRANSFER TERM |
|---|---|
| a@A.ne.jp | 2007/1/1~2007/1/7 |
| c@C.ne.jp | 2007/2/6~2007/2/9 |

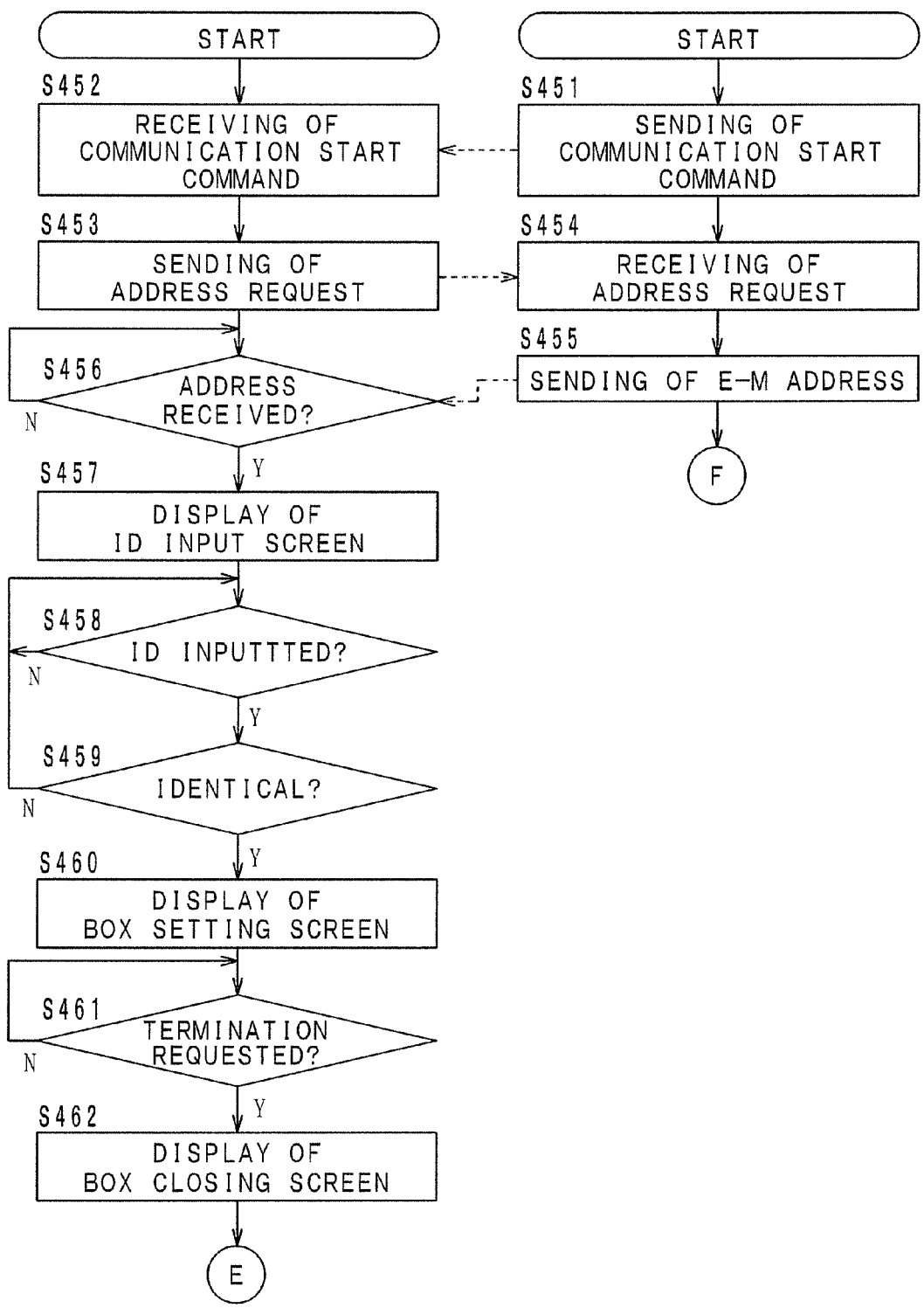

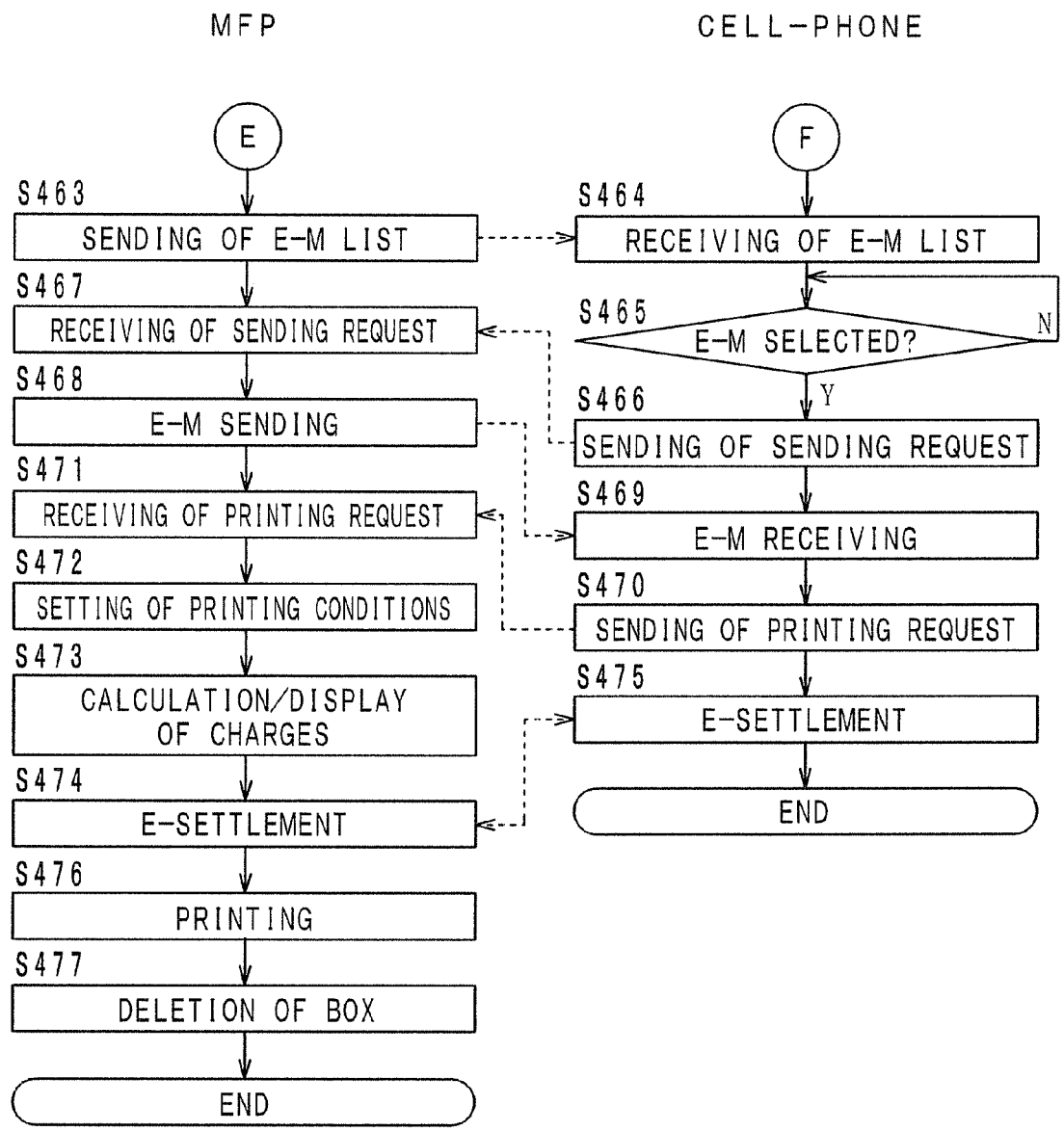

COMMUNICATION SYSTEM AND COMMUNICATION METHOD

This application is based on Japanese patent application No. 2007-037201 filed on Feb. 16, 2007, the content of which is herewith incorporated by reference.

BACKGROUND OF THE INVENTION

1. Field of the Invention

The present invention relates to a communication system and a communication method, and more particularly to a communication system comprising a radio communication terminal, a base station and image processing apparatuses connected to the base station to be communicable with the base station, and a communication method in the system.

2. Description of Related Art

While a cell-phone is downloading data, such as an e-mail, from a base station, when a user of the cell-phone moves out of a service area into a non-service area, the communication between the cell-phone and the base station is cut, and the user cannot get the data any more. In this case, the user of the cell-phone must move back in the service area and start download again. Unless the user moves back in the service area, the user cannot download the data to his/her cell-phone. For example, when the user must stay in the non-service area for a long time because of a business trip, the user cannot get the data for a while.

In the non-service area, there may be a store which is installed with an image processing apparatus with a function as a communication device, for example, an MFP (multifunction peripheral) which functions as a scanner for obtaining image data by reading a document, as a printer for printing an image in accordance with image data and as a facsimile for sending and receiving facsimile data. Therefore, it is demanded to establish a system for permitting a user out of a service area can get data from the base station via such an image processing apparatus.

As a device for permitting communication between a cell-phone existing in a non-service area and the base station, for example, a high-frequency digital conversion communication device is disclosed by Japanese patent laid-open publication No. 2004-40449. According to the publication, a relay connected to a base station via an optical fiber is provided in a non-service area and relays a cell-phone in the non-service area to the base station.

SUMMARY OF THE INVENTION

An object of the present invention is to provide a communication system and a communication method for permitting a user of a radio communication terminal to receive data from a base station in a non-service area via an image processing apparatus.

A communication system according to the present invention comprises a radio communication terminal, a base station communicable with the radio communication terminal by radio wave and a plural number of image processing apparatuses connected to the base station by cables to be communicable with the base station. In the communication system, the radio communication terminal comprises a sending section for sending a data transfer request to the base station. The base station comprises: a receiving section for receiving the data transfer request; a storage section for storing electronic data therein; and a first sending section for sending electronic data of which addressee is the radio communication terminal, which sent the data transfer request, to the image processing apparatuses. Each of said plural number of image processing apparatuses comprises: a first receiving section for receiving the electronic data; a storage section for storing the electronic data therein; and a first sending section for sending the electronic data from the storage section to the radio communication terminal which is the addressee of the electronic data.

In the communication system, the radio communication terminal may further comprise an input section for receiving an input from the user, and the sending section of the radio communication terminal may send term information inputted by the user to the base station. Then, the first sending section of the base station may send the electronic data to the image processing apparatuses only within a term shown by the inputted term information.

In the communication system, the storage section of the base station may be stored with transfer destination information on the image processing apparatuses communicable with the base station, and the base station may further comprise a second sending section for sending the transfer destination information to the radio communication terminal. Also, the radio communication terminal may further comprise a receiving section for receiving the transfer destination information and a selection section for permitting a user to select one from the image processing apparatuses shown by the transfer destination information. The data transfer request sent from the sending section of the radio communication terminal to the base station may include information on the image processing apparatus selected by the user to the base station, and the receiving section of the base station may receive the information on the selected image processing apparatus. Then, the first sending section of the base station may send the electronic data to the selected image processing apparatus.

In the communication system, the base station may further comprise a condition detecting section for detecting a communication condition with the radio communication terminal, and the second sending section of the base station may send the transfer destination information to the radio communication terminal when the condition detecting section detects that the communication condition with the radio communication terminal has become worse than a specified condition.

In the communication system, the transfer destination information may include information on the locations of the image processing apparatuses.

In the communication system, the radio communication terminal may further comprise a position information receiving section for receiving position information on a current position of itself from an artificial satellite, and the sending section of the radio communication terminal may send the position information to the base station. Then, the receiving section of the base station receives the position information on the current position of the radio communication terminal. Also, the base station may further comprise a specifying section for specifying some of the image processing apparatuses which are located within a specified range of the current position of the radio communication terminal, and the second sending section of the base station may send the transfer destination information on the image processing apparatuses specified by the specifying section to the radio communication terminal.

In the communication system, the storage section of the base station may be further stored with map data, and the base station may further comprise a searching section for searching the map data for an area around the current position of the radio communication terminal. Then, the specifying section of the base station may specify some of the image processing apparatuses located in the searched area, and the second sending section of the base station may send map data on the searched area to the radio communication terminal together with the transfer destination information.

Also, in the communication section, the base station may further comprise a composing section for marking the locations of the image processing apparatuses specified by the specifying section in the area map data searched by the searching section to make composite map data, and the second sending section of the base station may send the composite map data to the radio communication terminal.

In the communication system, the radio communication terminal may further comprise an input section for receiving an input from a user, and the sending section of the radio communication terminal may send position information inputted by the user to the base station. Then, the receiving section of the base station receives the inputted position information. Also, the base station may further comprise a specifying section for specifying some of the image processing apparatuses which are located within a specified range from a position shown by the inputted position information, and the second sending section of the base station may send the transfer information on the image processing apparatuses specified by the specifying section.

In the communication system, the sending section of the radio communication terminal may send the data transfer request to one of the image processing apparatuses, and each of the image processing apparatuses may further comprise: a second receiving section for receiving the data transfer request and a second sending section for, when receiving the data transfer request, sending the data transfer request to the base station. Then, the receiving section of the base station receives the data transfer request, and the first sending section of the base station may send the electronic data to the image processing apparatus which sent the data transfer request.

The present invention is applicable to a communication method in the communication system. The communication method comprises: a step wherein the radio communication terminal sends a data transfer request to the base station; a step wherein the base station receives the data transfer request; a step wherein the base station sends electronic data which are stored in a storage section and of which addressee is the radio communication terminal, which sent the data transfer request, to the image processing apparatuses; a step wherein the image processing apparatuses receive the electronic data; a step wherein the image processing apparatuses store the electronic data therein; and a step wherein the image processing apparatuses send the electronic data to the radio communication terminal which is the addressee of the electronic data.

BRIEF DESCRIPTION OF THE DRAWINGS

This and other objects and features of the present invention will be apparent from the following description with reference to the accompanying drawings, in which:

FIG. 5 is an illustration of a user management table;

FIG. 6 is an illustration of an MFP management table;

FIG. 7 is an illustration of a sending error table;

FIG. 8 is an illustration of a transferred e-mail table;

FIG. 16 is an illustration of a transfer management table;

FIG. 17 is an illustration of a term management table;

FIGS. 31 and 32 are flowcharts showing a procedure carried out by the MFP and a procedure carried out by the cell-phone at the fourth stage of operation according to the fourth embodiment.

DETAILED DESCRIPTION OF THE PREFERRED EMBODIMENTS

First Embodiment

Figure 1:
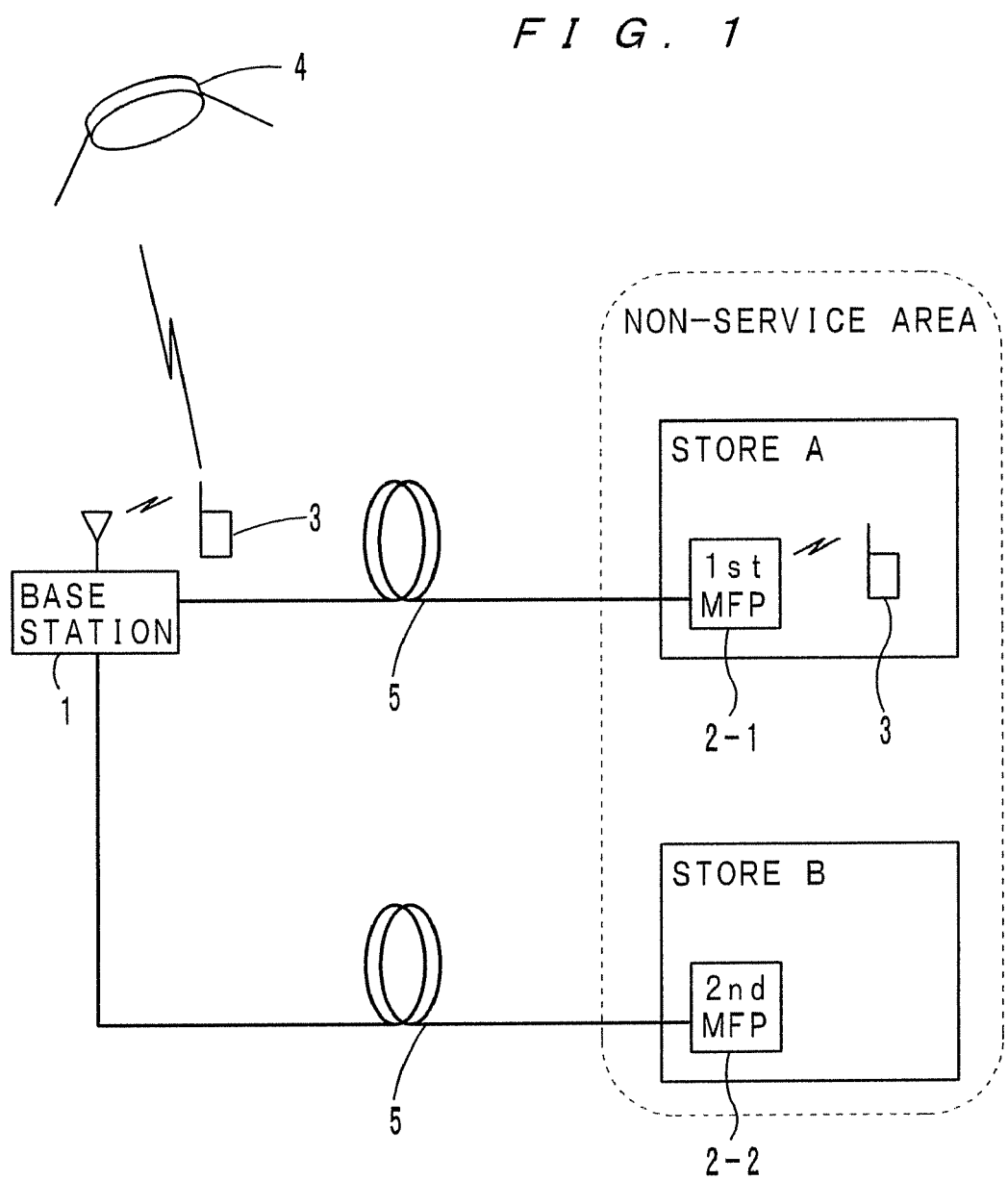
FIG. 1 is a block diagram showing the general structure of a communication system according to a first embodiment, a second embodiment or a third embodiment of the present invention.
Figure 2:
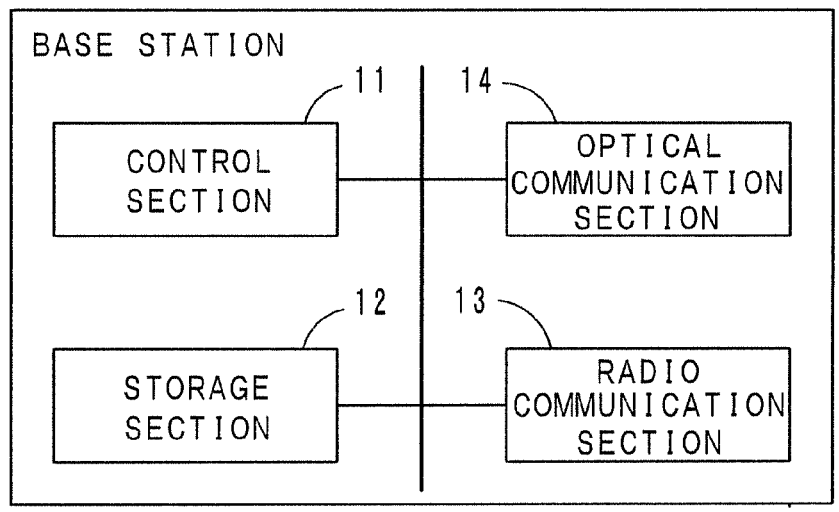
FIG. 2 is a block diagram showing the structure of a base station in the communication system.
Figure 3:
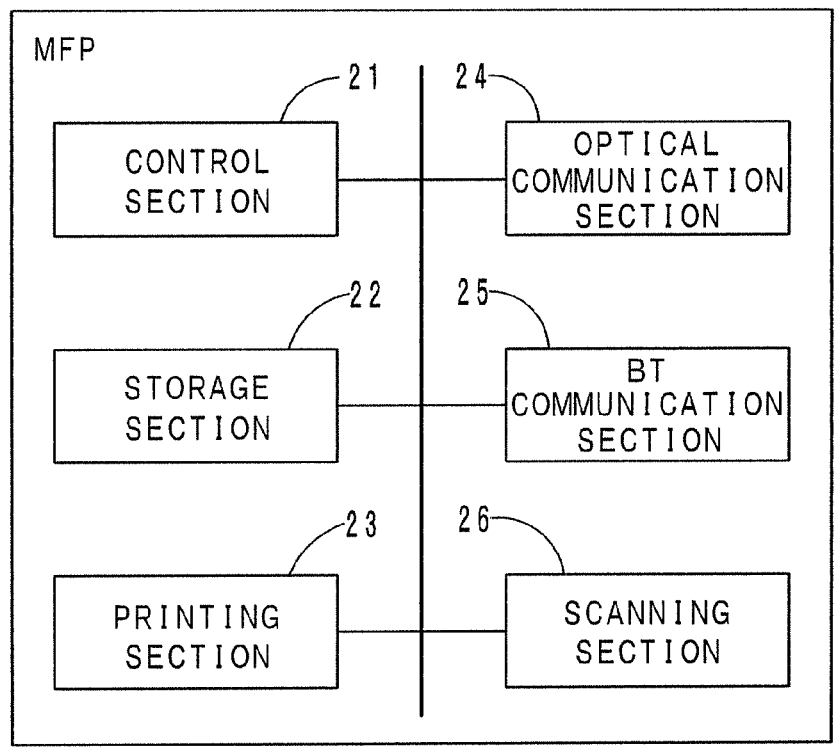
FIG. 3 is a block diagram showing the structure of an MFP in the communication system.
Figure 4:
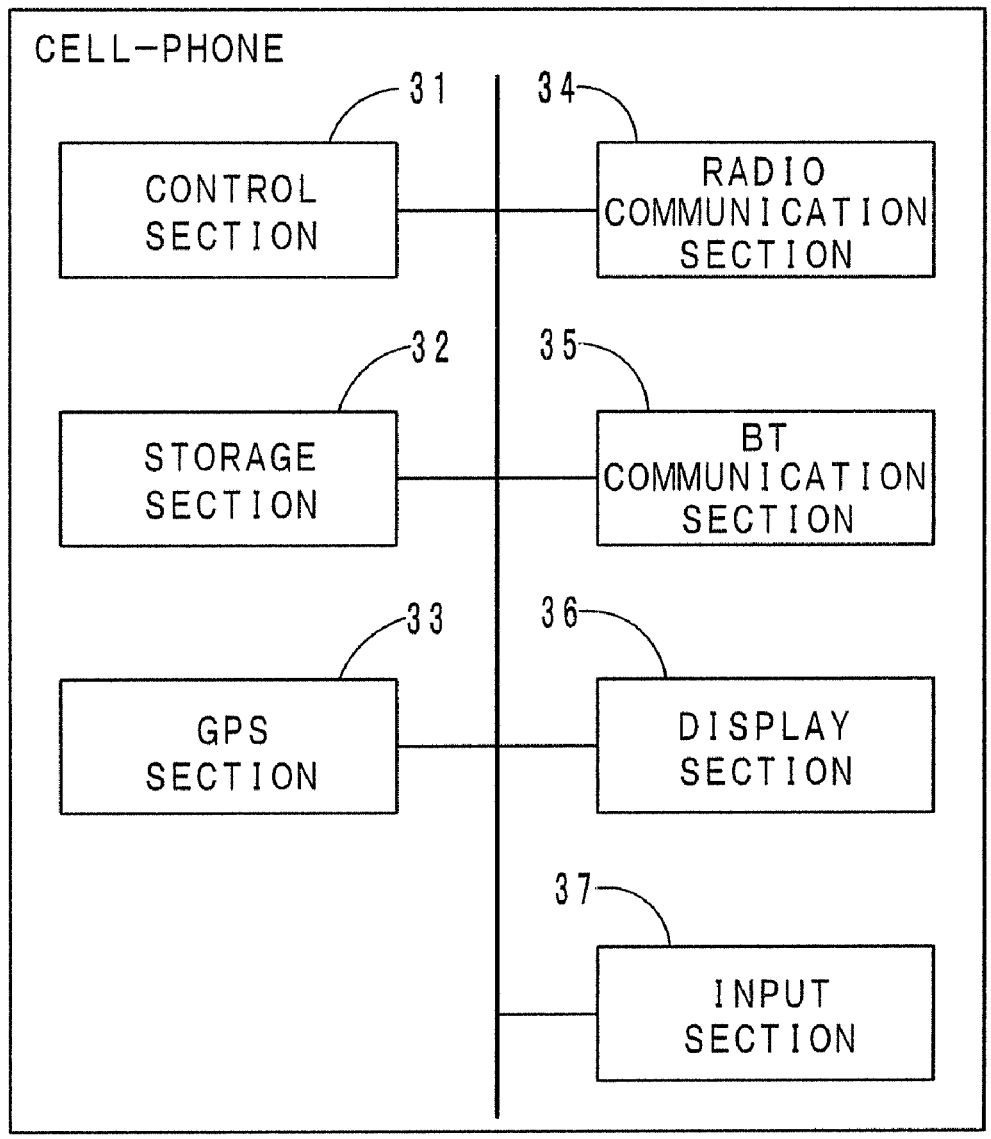
FIG. 4 is a block diagram showing the structure of a cell-phone in the communication system.

A communication system and a communication method according to a first embodiment of the present invention will be described with reference to the accompanying drawings. FIG. 1 is a block diagram showing the general structure of the communication system. FIG. 2 is a block diagram showing the structure of a base station 1 in the communication system. FIG. 3 is a block diagram showing the structure of an MFP (multi-function peripheral) 2 in the communication system. FIG. 4 is a block diagram showing the structure of a cell-phone 3 in the communication system.

[General Structure]

As FIG. 1 shows, the communication system comprises a base station 1, a plural number of MFPs 2 as image processing apparatuses, a cell-phone 3 as a radio communication terminal, an artificial satellite 4 and an optical-fiber cable 5. A first MFP 2-1, a second MFP 2-2, a third MFP 2-3 and a fourth MFP 2-4 are connected to the base station 1. In FIG. 1, however, the third MFP 2-3 and the fourth MFP 2-4 are not shown. The first MFP 2-1, the second MFP 2-2, the third MFP 2-3 and the fourth MFP 2-4 are generally called MFPs 2, and in order to denote the individual MFPs 2, hyphens and digits 1 to 4 are provided.

The communication system is to offer an e-mail transfer service as will be described below. When communication between the cell-phone 3 and the base station 1 comes in a bad state while the cell-phone 3 is receiving electronic data of an e-mail from the base station 1, the base station 1 sends the cell-phone 3 a map showing the locations of the first MFP 2-1 and the second MFP 2-2. It is supposed that the user of the cell-phone 3 selects the first MFP 2-1 on the map, and the user notifies the base station 1 from his/her cell-phone 3 that the first MFP 2-1 is designated as the destination of transfer. Accordingly, the base station 1 sends the e-mail to the first MFP 2-1 via the optical-fiber cable 5. Then, the user moves to the first MFP 2-1 and receives the e-mail from the first MFP 2-1 into the cell-phone 3 by short-distance wireless communication. The structures of the base station 1, the MFP 2 and the cell-phone 3 are described below.

The base station 1 is a relay station of the cell-phone 3. As FIG. 2 shows, the base station 1 comprises a control section 11 which is specifically a CPU, a storage section 12 which is specifically a hard disk, a radio communication section 13 which is specifically a radio communication interface and an optical communication section 14 which is specifically an optical communication interface.

As FIG. 3 shows, the MFP 2 comprises a control section 21 which is specifically a CPU, a storage section 22 which is specifically a hard disk, a printing section 23, an optical communication section 24 which is specifically an optical communication interface, a BT communication section 25 which is a communication interface for short-distance wireless communication via Blue Tooth (trade name), and a scanning section 26. The MFP 2 is installed in a store (for example, a convenience store) in a non-service area and is connected to the base station 1 to be communicable with each other via the optical-fiber cable 5. The first MFP 2-1 and the second MFP 2-2 are, as shown in FIG. 1, installed in different stores in the same non-service area. In the following paragraphs, in order to designate the components of the individual MFPs 2, the reference numbers showing the components are provided with hyphens and digits 1 to 4. For example, the control section 21 of the first MFP 2-1 is denoted by 21-1.

The cell-phone 3 sends and receives electronic data such as e-mails to and from the base station 1 by radio wave, and the cell-phone 3 has an e-mail address "a@A.ne.jp". Also, the cell-phone 3 sends and receives data such as e-mails to and from the MFP 2 by short-distance wireless communication, for example, by Blue Tooth (trade name). As FIG. 4 shows, the cell-phone 3 comprises a control section 31 which is specifically a CPU, a storage section 32 which is specifically a non-volatile memory, a GPS section 33, a radio communication section 34 which is a radio communication interface, a BT communication section 35 which is an interface for short-distance wireless communication via Blue Tooth (trade name), a display section 36 which is a liquid crystal display and an input section 37 comprising a plural number of input buttons. Next, the functions of the components of the base station 1, the MFP 2 and the cell-phone 3 during operation of the communication system are described.

The cell-phone 3 confirms its position and sends the position to the base station 1 periodically. For the purpose, the GPS section 33 receives information on the current position of the cell-phone 3 from the artificial satellite 4. The position information shows, for example, the latitude and the longitude of the current position of the cell-phone 3. The radio communication section 34 of the cell-phone 3 sends the position information and condition information on the condition of communication between the cell-phone 3 and the base station 1 to the base station 1 at regular time intervals. The condition information is specifically the number (0 to 3) of base stations 1 communicable with the cell-phone 3, which is ordinarily displayed on the display section 36 of the cell-phone 3.

The radio communication section 13 of the base station 1 communicates with the cell-phone 3 by radio wave and receives the position information and the condition information from the cell-phone 3 periodically. From the position information and the condition information, the base station 1 knows the position and the condition of the cell-phone 3. More specifically, the storage section 12 is stored with a user management table as shown by FIG. 5, and in the user management table, for example, in connection with the e-mail address "a@A.ne.jp" of the cell-phone 3, the current position "Long. 135° 20'15" E, Lat. 35° 21' 20" N", the condition "1" and the ID number "1234" are recorded. The e-mail addresses, the positions, the conditions and the ID numbers of not only the cell-phone 3 but also other cell-phones which can receive the e-mail transfer service from the system are recorded in the user management table.

The condition information shows the number of base stations 1 which the cell-phone 3 is communicable with, and when the number changes from "3" to "0", it shows that the communication condition becomes bad. The ID number is a four-digit number which is required to present when the user wishes to receive the e-mail transfer service from the system.

The base station 1 relays e-mails. For example, when the base station 1 receives an e-mail addressed to the cell-phone 3, the base station 1 passes the e-mail to the cell-phone 3. For this purpose, the storage section 12 of the base station 1 is stored with e-mails sent from communication terminals, and the radio communication section 13 sends e-mails addressed to the cell-phone 3 to the cell-phone 3.

While the base station 1 is sending an e-mail to the cell-phone 3, when the communication condition becomes bad, the base station 1 informs the cell-phone 3 of impossibility of e-mail sending and sends a composite map wherein the locations of MFPs 2 are shown on a map of an area around the current position of the cell-phone 3. For this purpose, the control section 11 recognizes the condition of communication between the cell-phone 3 and the base station 1 from the user management table shown by FIG. 5. The storage section 12 of the base station 1 is stored with map data, the user management table shown by FIG. 5 and an MFP management table shown by FIG. 6. In the MFP management table, information on the MFPs 2 which are connected and communicable with the base station 1 and which can receive e-mails from the base station 1 is recorded. Specifically, the names, the locations, the IP addresses and the store names are recorded in connection with the individual MFPs 2. Further, the storage section 12 of the base station 1 is stored with a sending error table, in which e-mails which could not be sent completely because of a bad communication condition are listed. In the sending error table, in connection with the individual e-mails which were not completely sent, the titles, the addresses (e-mail addresses) and the names of the MFPs designated as the transfer destinations are recorded.

The control section 11 of the base station 1 recognizes the current position of the cell-phone 3 from the user management table and searches the map data for an area around the current position of the cell-phone 3. The control section 11 further searches the MFP management table for MFPs 2 located within a specified range from the current position of the cell-phone 3. The specified range from the current position of the cell-phone 3 means the range within the area map with a specified scale. Thus, the control section 11 specifies MFPs 2 located within the specified range from the current position of the cell-phone 3.

The control section 11 of the base station 1 makes a composite map by marking the locations of the specified MFPs 2 on the searched area map. Then, the radio communication section 13 sends the composite map to the cell-phone 13.

The radio communication section 34 of the cell-phone 3 receives the composite map. The display section 36 displays the composite map. The input section 37 permits the user of the cell-phone 3 to select one from the MFPs 2 shown in the map. Then, the radio communication section 34 sends the name of the selected MFP 2 to the base station 1 as a transfer request.

The radio communication section 13 of the base station 1 receives the transfer request. Then, the optical communication section 14 searches the sending error table for an e-mail addressed to the cell-phone 3, which has sent the transfer request, and sends the e-mail to the MFP 2 with the name included in the transfer request.

The MFP 2 stores the e-mails sent from the base station 1 therein. Then, the MFP 2 sends the e-mail to the cell-phone 3 at a request of the cell-phone 3. For this purpose, the optical communication section 24 of the MFP 2 receives the e-mail from the base station 1. The storage section 22 of the MFP 2 is stored with the e-mail and a transferred e-mail table as shown by FIG. 8, which is a list of e-mails stored in the storage section 22. In the transferred e-mail table, in connection with the individual addresses of the e-mails, the titles of the e-mails are recorded.

The BT communication section 25 of the MFP 2 searches the transferred e-mail table for an e-mail addressed to the cell-phone 3 and sends the e-mail to the cell-phone 3 at a request of the cell-phone 3.

[Operation of the Communication System]

Operation of the communication system of the above-described structure is hereinafter described with reference to the accompanying drawings. The communication system operates through the following four stages: (1) a first stage wherein the base station 1 receives information from the cell-phone 3 at regular time intervals on the current position and on the communication condition of the cell-phone 3; (2) a second stage wherein the cell-phone 3 designates an MFP 2 as the transfer destination of an e-mail and notifies the base station 1 of the designated MFP 2; (3) a third stage wherein the base station 1 sends an e-mail to the MFP 2; and (4) a fourth stage wherein the cell-phone 3 receives the e-mail from the MFP 2. In the following paragraphs, a case wherein an e-mail addressed to the cell-phone 3 is transferred to the first MFP 2-1 is described.

Figure 9:
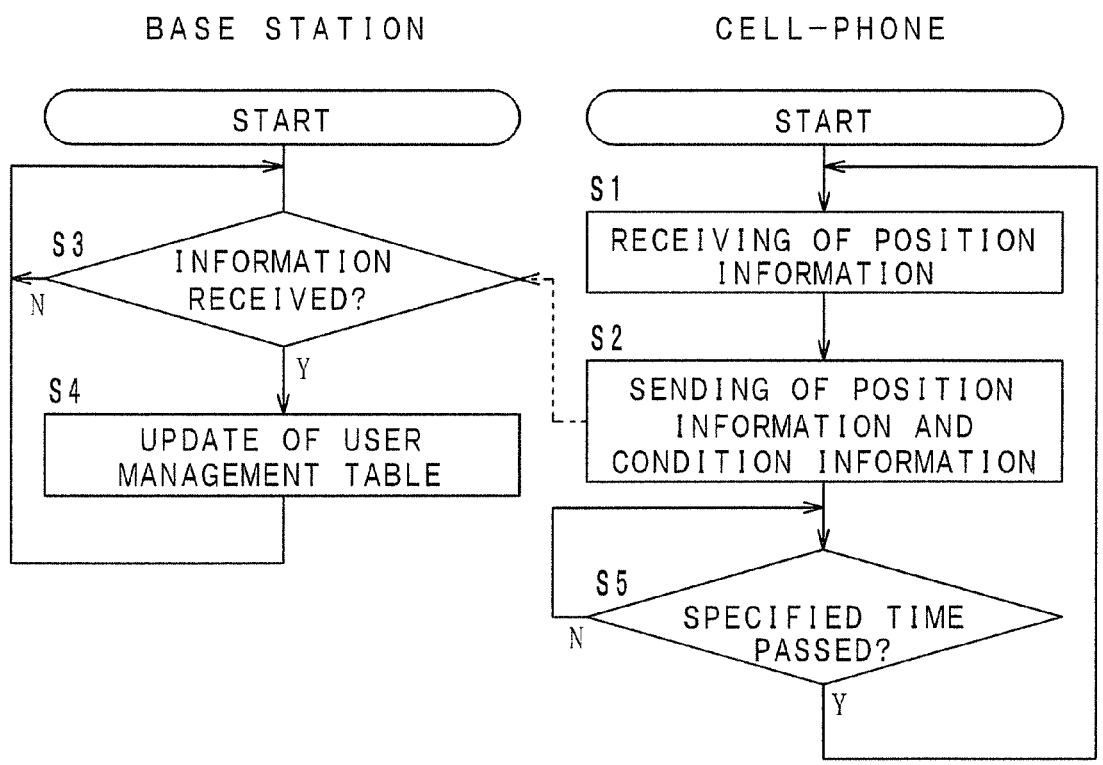
FIG. 9 is a flowchart showing a procedure carried out by the base station and a procedure carried out by the cell-phone at the first stage of operation according to the first embodiment.
Figure 10:
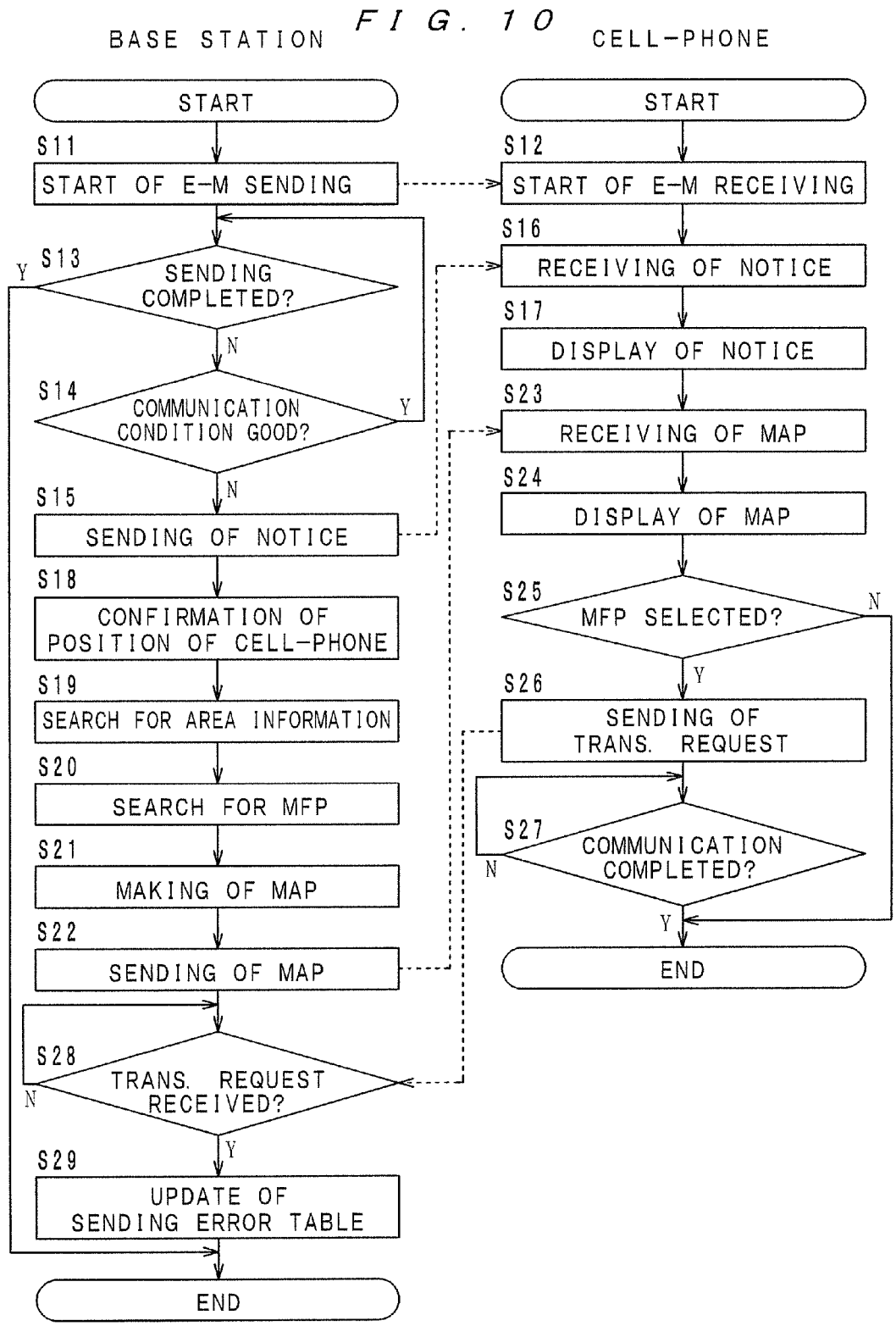
FIG. 10 is a flowchart showing a procedure carried out by the base station and a procedure carried out by the cell-phone at the second stage of operation according to the first embodiment.
Figure 11:
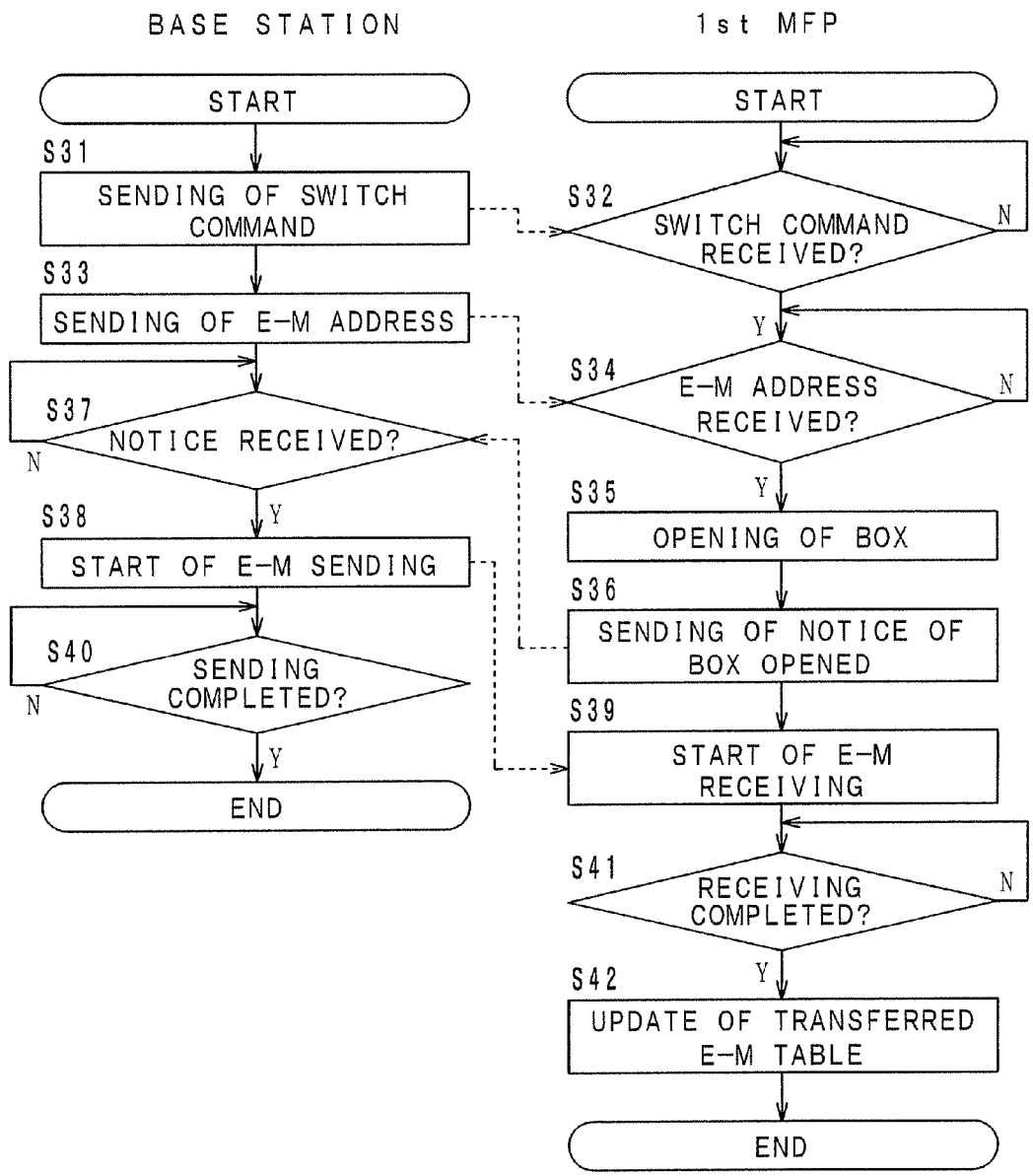
FIG. 11 is a flowchart showing a procedure carried out by the base station and a procedure carried out by a first MFP at the third stage of operation according to the first embodiment.
Figure 12:
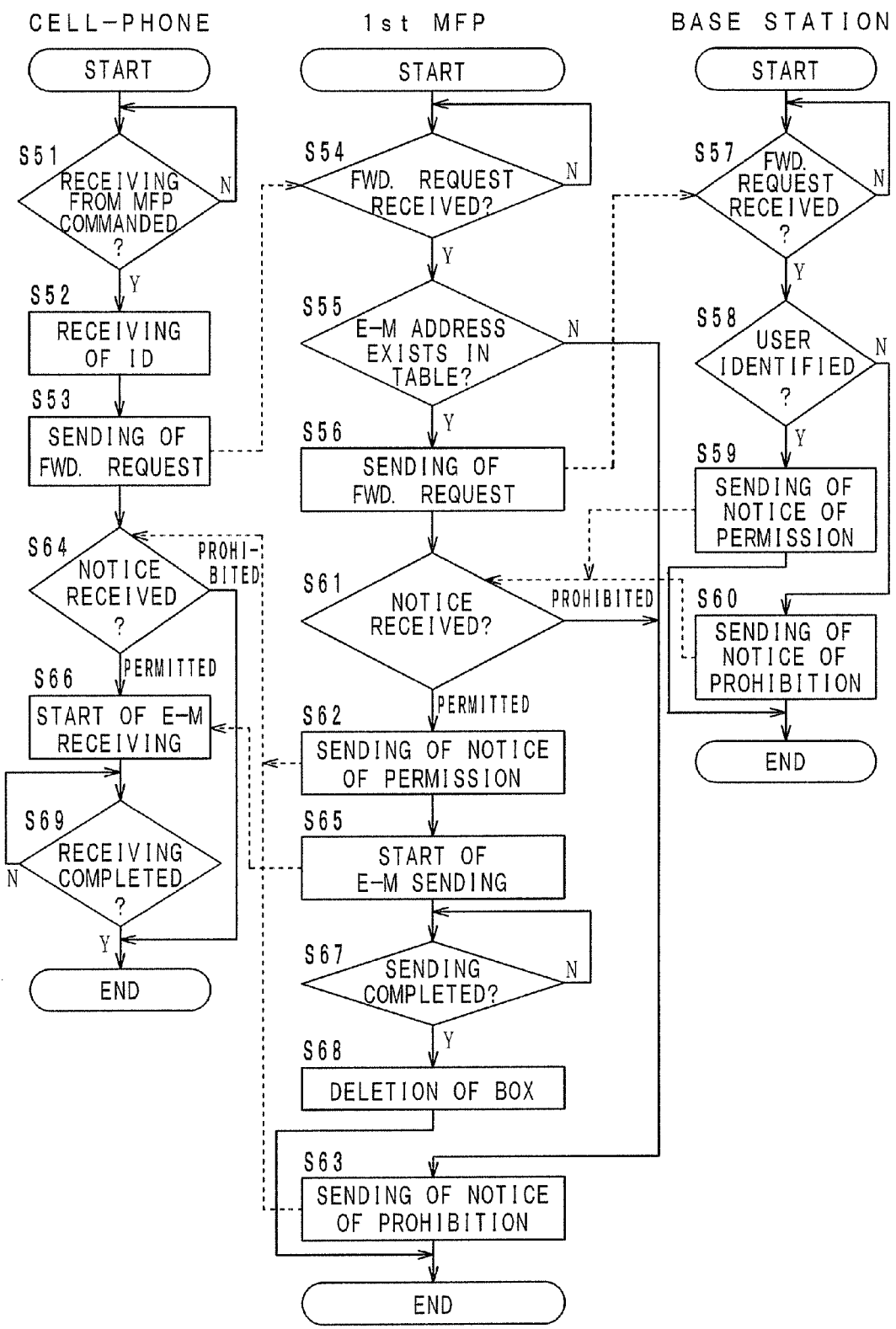
FIG. 12 is a flowchart showing a procedure carried out by the first MFP and a procedure carried out by the cell-phone at the fourth stage of operation according to the first embodiment.

FIG. 9 is a flowchart showing a procedure carried out by the base station 1 and a procedure carried out by the cell-phone 3 at the first stage. FIG. 10 is a flowchart showing a procedure carried out by the base station 1 and a procedure carried out by the cell-phone 3 at the second stage. FIG. 11 is a flowchart showing a procedure carried out by the base station 1 and a procedure carried out by the first MFP 2-1 at the third stage. FIG. 12 is a flowchart showing a procedure carried out by the base station 1, a procedure carried out by the first MFP 2-1 and a procedure carried out by the cell-phone 3 at the fourth stage. The control sections 11, 21-1 and 31 of the base station 1, the first MFP 2-1 and the cell-phone 3 may carry out the procedures in the flowcharts by executing software programs stored in the storage sections 12, 22-1 and 32 or by using hardware circuits provided for exclusive purposes.

[First Stage]

First, referring to FIG. 9, operation at the first stage is described. The control section 31 of the cell-phone 3 commands the GPS section 33 to receive information on the current position of the cell-phone 3, that is, the latitude and the longitude from the artificial satellite 4 (step S1). Next, the control section 31 of the cell-phone 3 commands the radio communication section 34 to send the information on the current position which the GPS section 33 received and information on the communication condition between the base station 1 and the cell-phone 3 to the base station 1 (step S2).

The control section 11 of the base station 1 stands by while detecting whether the radio communication section 13 has received information on the current position and the communication condition from the cell-phone 3 (step S3). When the communication section 13 has received position information and condition information, the processing goes to step S4.

When the communication section 13 has received position information and condition information, the control section 11 updates the user management table (shown by FIG. 5) stored in the storage section 12 in accordance with the received information (step S4). For example, the control section 11 records "Long.135°20'15" E, Lat.35°21'20" N" in the user management table as the current position of the cell-phone 3 with an e-mail address of "a@A.ne.jp". The control section 11 also records "1", which is the number of base stations communicable with the cell-phone 3, in the user management table as the communication condition of the cell-phone 3 with an e-mail address of "a@A.ne.jp". Then, the processing of the base station 1 returns to step S3.

Meanwhile, the control section 31 of the cell-phone 3 stands by while detecting whether a specified time has passed since the sending of position information and condition information (step S5). When the specified time has passed, the processing returns to step S1. Thus, position information and condition information of the cell-phone 3 are sent to the base station 1 at regular time intervals. The processing at the first stage is carried out when the control section 31 of the cell-phone 3 activates an exclusive application for receiving the e-mail transfer service in the inventive communication system, and while the exclusive application is operating, the processing is carried out all the time.

[Second Stage]

Next, referring to FIG. 10, operation at the second stage is described. Processing at the second stage starts when the exclusive application in the cell-phone 3 is activated. First, the control section 11 of the base station 1 picks up an e-mail addressed to the cell-phone 3 from the storage section 12 and commands the radio communication section 13 to start e-mail sending (step S11). At this time, the radio communication section 34 of the cell-phone 3 starts e-mail receiving (step S12). The processes at steps S11 and S12 are conventional processes for ordinary e-mail sending/receiving, and detailed descriptions of the processes are omitted.

After the start of e-mail sending, the control section 11 of the base station 1 detects whether the e-mail sending has been completed (step S13). When the e-mail sending has been completed, the processing ends. When the e-mail sending has not been completed, the processing goes to step S14.

When the e-mail sending has not been completed, the control section 11 of the base station 1 judges with reference to the user management table whether the communication condition between the base station 1 and the cell-phone 3 is good (step S14). Specifically, if the value recorded as the communication condition is "2" or more, the control section 11 judges that the communication condition is good. If the value recorded as the communication condition is "1" or less, the control section 11 judges that the communication condition is bad. For example, in the user management table shown by FIG. 5, the communication condition of the cell-phone 3 with an e-mail address of "a@A.ne.jp" is "1", and the control section 11 judges that the communication condition is bad. When the communication condition is good, the processing returns to step S13. When the communication condition is bad, the processing goes to step S15.

When the communication condition is bad, the control section 11 of the base station 1 commands the radio communication section 13 to send a notice to notify the cell-phone 3 that the communication condition between the base station 1 and the cell-phone 3 has become bad during e-mail sending (step S15). The radio communication section 34 of the cell-phone 3 receives the notice (step S16), and the control section 31 of the cell-phone 3 commands the display section 36 to display the notice (step S17). Thereby, the user of the cell-phone 3 knows that the communication condition with the base station 1 has become bad.

After the notice is sent at step S15, the control section 11 of the base station 1 confirms the current position of the cell-phone 3 with reference to the user management table (shown by FIG. 5) stored in the storage section 12 (step S18). In the user management table shown by FIG. 5, the current position of the cell-phone 3 is "Long. 135°20'15" E, Lat. 35°21'20" N". The control section 11 of the base station 1 searches map data stored in the storage section 12 for an area map, with a specified scale, including the current position of the cell-phone 3, "Long. 135°20'15" E, Lat. 35°21'20" N", and reads out the map from the storage section 12 (step S19).

Next, the control section 11 of the base station 1 searches the MFP management table (shown by FIG. 6) stored in the storage section 12 for MFPs 2 existing in a specified range from the current position of the cell-phone 3 (step S20). The specified range means the range of the map read out at step S19. In this embodiment, with reference to the MFP management table shown by FIG. 6, the first MFP 2-1 and the second MFP 2-2 existing near "Long. 135°20'15" E, Lat. 35°21'20" N" are picked up.

Figure 13:
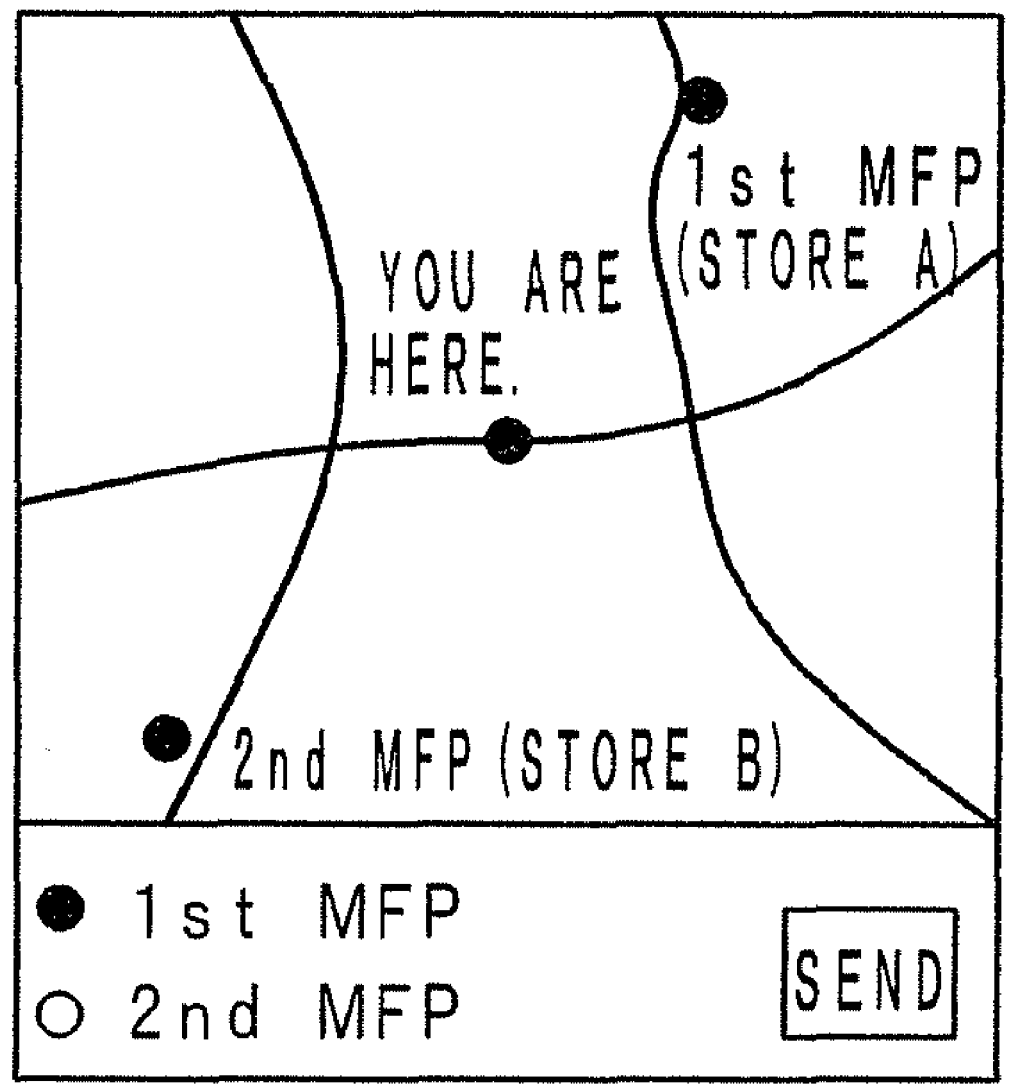
FIG. 13 is an illustration of a composite map.

Next, the control section 11 of the base station 1 makes a composite map by marking locations of the MFPs 2 in the read-out map (step S21). Specifically, the control section 11 makes a composite map as shown by FIG. 13 by marking the location of the first MFP 2-1, the location of the second MFP 2-2 and the current position of the cell-phone 3 on the map. In this moment, preferably, the names of the first and second MFPs 2 and the names of stores A and B installed with the first and second MFPs 2 are shown. Moreover, a picture to promote the user to select one from the MFPs 2 is combined with the composite map.

Next, the control section 11 of the base station 1 commands the radio communication section 13 to send the composite map to the cell-phone 3 (step S22). The radio communication section 34 of the cell-phone 3 receives the composite map (step S23). Then, the control section 31 commands the display section 36 to display the composite map as shown by FIG. 13 (step S24). Thereby, the user of the cell phone 3 knows the locations of the first MFP 2-1 and the second MFP 2-2 existing nearby.

After displaying the composite map, the control section 31 detects whether the user of the cell-phone 3 has selected an MFP 2 as the transfer destination of the e-mail (step S25). In the selection area displayed below the composite map, the user selects either the first MFP 2-1 or the second MFP 2-2 and pushes a "SEND" button by use of the input section 37. At this time, the control section 31 judges that the first MFP 2-1 or the second MFP 2-2 has been selected, and the processing goes to step S26. On the other hand, when no selection has been made, the cell-phone 3 completes the second stage.

When an MFP 2 is selected, the control section 31 of the cell-phone 3 commands the radio communication section 34 to send a transfer request, including the name of the selected MFP 2, to the base station 1 (step S26). For example, in FIG. 13, the first MFP 2-1 is selected, and the radio communication section 34 sends a transfer request including the name of the selected MFP, "first MFP". Thereafter, the control section 31 stands by while judging communication with the base station 1 has been completed (step S27). In other words, the control section 31 judges whether the user of the cell-phone 3 has disconnected the communication with the base station 1. When the user of the cell-phone 3 has disconnected the communication with the base station 1, the cell-phone 3 has completed the second stage.

The control section 11 of the base station 1 stands by while detecting whether a transfer request including the name of a selected MFP has been received from the cell-phone 3 (step S28). When the base station 1 has received a transfer request from the cell-phone 3, the processing goes to step S29.

When the control section 11 has received a transfer request including the name of a selected MFP, the control section 11 updates the sending error table (shown by FIG. 7) stored in the storage section 12 (step S29). Specifically, in the sending error table, the control section 11 records the title of the e-mail of which sending ended in failure, the name of an MFP designated as the transfer destination of the e-mail, the e-mail address of the cell-phone 3 which is the addressee of the e-mail. For example, when the title of the e-mail is "Conference", as shown in FIG. 7, the e-mail address of the cell-phone 3 "a@A.ne.jp" is recorded, and the title of the e-mail "Conference" is recorded. Further, the control section 11 records "first MFP" included in the transfer request as the transfer destination. Thereby, the first MFP 2-1 is designated as the transfer destination of the e-mail.

[Third Stage]

On completion of the second stage, the third stage starts immediately. Referring to FIG. 11, operation at the third stage is described. The control section 11 of the base station 1 looks up the IP address of the first MFP 2-1 designated as the transfer destination in the MFP management table shown by FIG. 6 and commands the optical communication section 14 to send a switch command to the IP address of the first MFP 2-1 (step S31). The switch command is to notify the first MFP 2-1 that the base station 1 will send an e-mail to the first MFP 2-1. Whenever the base station 1 is to send information to the first MFP 2-1, the control section 11 looks up the IP address of the first MFP 2-1 in the MFP management table. In the paragraphs below, however, a description of the process of looking up the IP address is omitted, and it will be merely stated that the base station 1 sends information to the first MFP 2-1.

Meanwhile, the control section 21-1 of the first MFP 2-1 stands by while detecting whether the optical communication section 24-1 has received a switch command (step S32). When the optical communication section 24-1 has received a switch command, the processing goes to step S34.

When the sending of a switch command is completed, the control section 11 of the base station 1 commands the optical communication section 14 to send the e-mail address "a@A.ne.jp", which was recorded in the sending error table at step S29 of the second stage, to the first MFP 2-1 (step S33).

Meanwhile, the control section 21-1 of the first MFP 2-1 stands by while detecting whether the optical communication section 24-1 has received the e-mail address (step S34). When the optical communication section 24-1 has received the e-mail address, the processing goes to step S35.

At step S35, the control section 21-1 of the first MFP 2-1 opens an exclusive box for the e-mail address received at step S34 in the storage section 22-1. The exclusive box is an area to be stored with e-mails addressed to an e-mail address, for example, the address "a@A.ne.jp" of the cell-phone 3. Further, the control section 21-1 records the e-mail address of the cell-phone 3 "a@A.ne.jp" in the transferred e-mail table shown by FIG. 8. When the exclusive box is opened, the control section 21-1 sends a notice to the base station 1 via the optical communication section 24-1 to notify that an exclusive box has been opened (step S36).

The control section 11 of the base station 1, which has sent the e-mail address, stands by while detecting whether it has received a notice of opening of an exclusive box from the first MFP 2-1 (step S37). When the control section 11 of the base station 1 has received a notice of opening of an exclusive box from the first MFP 2-1, the processing goes to step S38.

Next, the control section 11 of the base station 1 reads out an e-mail addressed to the cell-phone 3 "a@A.ne.jp" from the storage section 12 with reference to the sending error table shown by FIG. 7 and starts sending the e-mail to the first MFP 2-1 (step S38). For example, referring to the sending error table shown by FIG. 7, the title of an e-mail addressed to "a@A.ne.jp" is "Conference". The transfer destination of the e-mail is the first MFP 2-1. Therefore, the control section 11 reads out the e-mail addressed to "a@A.ne.jp" and titled "Conference" from the storage section 12 and commands the optical communication section 14 to send the e-mail to the first MFP 2-1.

The optical communication section 24-1 of the first MFP 2-1 starts receiving the e-mail from the base station 1 (step S39). The control section 11 of the base station 1 stands by while detecting the e-mail sending has been completed (step S40). When the e-mail sending has been completed, the base station 1 completes the third stage. Meanwhile, the control section 21-1 of the first MFP 2-1 stands by while detecting the e-mail receiving has been completed (step S41). When the e-mail receiving has been completed, the processing goes to step S42.

At step S42, the control section 21-1 of the first MFP 2-1 records the addressee and the title of the received e-mail in the transferred e-mail table (as shown by FIG. 8) stored in the storage section 22-1. Specifically, the control section 21-1 records the addressee "a@A.ne.jp" and the title "Conference" in the same row of the transferred e-mail table. Then, the first MFP 2-1 completes the third stage. Thus, at the third stage, an e-mail is sent to the first MFP 2-1 which is designated by the cell-phone 3 as the transfer destination.

[Fourth Stage]

On completion of the third stage, the user of the cell-phone 3 moves to the first MFP 2-1 with reference to the composite map as shown by FIG. 13. Then, the user operates the cell-phone 3 to activate the exclusive application for the e-mail transfer service offered by the inventive communication system. When the application starts, the control section 31 of the cell-phone 3 commands the display section 36 to display a screen to promote the user to make a command to receive an e-mail from the first MFP 2-1. Thereafter, the control section 31 stands by while detecting whether the user has made a command to receive an e-mail from the MFP 2-1 (step S51). When the user has made a command, the processing goes to step S52.

When the user has made a command to receive an e-mail, the control section 31 of the cell-phone 3 commands the display section 36 to display an ID input screen to promote the user to input the ID number. The user inputs the ID number by use of the input section 37. The ID number is a four-digit number stored in the user management table shown by FIG. 5, and the ID number of the cell-phone 3 with an e-mail address of "a@A.ne.jp" is "1234". When the user inputs the ID number, the control section 31 receives the ID number (step S52).

The control section 31 which has received the ID number commands a BT communication section 35 to send a forwarding request to the first MFP 2-1 (step S53). The forwarding request includes at least the ID number "1234" and the e-mail address "a@A.ne.jp". Meanwhile, the control section 21-1 of the first MFP 2-1 stands by while detecting whether the BT communication section 25 has received a forwarding request (step S54). When the BT communication section 25-1 has received a forwarding request, the processing goes to step S55.

At step S55, the control section 21-1 of the first MFP 2-1 judges whether the e-mail address "a@A.ne.jp" included in the forwarding request is in the transferred e-mail table shown by FIG. 8. When the e-mail address "a@A.ne.jp" is in the transferred e-mail table, the processing goes to step S56. When the e-mail address "a@A.ne.jp" is not in the transferred e-mail table, the processing goes to step S63. The process at step S63 will be described later.

When the e-mail address "a@A.ne.jp" is in the transferred e-mail table, the control section 21-1 of the first MFP 2-1 commands the optical communication section 24-1 to send the forwarding request received at step S54 to the base station 1 (step S56). Thereafter, the processing goes to step S57. At step S57 to S60, identification of the user is performed.

At step S57, the control section 11 of the base station 1 stands by while detecting whether the optical communication section 14 has received a forwarding request from the first MFP 2-1. When the optical communication section 14 has received a forwarding request, the processing goes to step S58.

When the optical communication section 14 has received a forwarding request, the control section 11 of the base station 1 looks up the ID number of the e-mail address "a@A.ne.jp" in the user management table shown by FIG. 5 and reads out the ID number "1234". Then, the control section 11 judges whether the read-out ID number "1234" is identical with the ID number included in the forwarding request (step S58). When the both numbers are identical with each other (when the user is identified), the processing goes to step S59. When the numbers are not identical with each other, the processing goes to step S60.

When the numbers are identical, the control section 11 of the base station 1 commands the optical communication section 14 to send a notice of permission to the first MFP 2-1 to notify that sending of the e-mail to the cell-phone 3 is permitted (step S59). On the other hand, when the numbers are not identical, the control section 11 of the base station 1 commands the communication section 14 to send a notice of prohibition to the first MFP 2-1 to notify that sending of the e-mail to the cell-phone 3 is prohibited (step S60). On completion of the process at step S59 or S60, the base station 1 completes the fourth stage.

At step S61, the control section 21 of the MFP 2-1 judges whether the optical communication section 24-1 has received a notice of permission or a notice of prohibition as the result of identification of the user at steps S57 to S60. When the optical communication section 24-1 has received a notice of prohibition, the processing goes to step S63. When the optical communication section 24-1 has received a notice of permission, the processing goes to step S62.

At step S63, the control section 21-1 of the first MFP 2-1 commands the BT communication section 25-1 to send a notice of prohibition to the cell-phone 3 to notify that forwarding of the e-mail is prohibited. On completion of sending of a notice of prohibition, the first MFP 2-1 completes the fourth.

On the other hand, when the optical communication section 24-1 has received a notice of permission, the control section 21-1 of the first MFP 2-1 commands the BT communication section 25-1 to send a notice of permission to the cell-phone 3 to notify that forwarding of the e-mail is permitted (step S62). Thereafter, the processing goes to step S64.

At step S64, the control section 31 of the cell-phone 3, which sent the forwarding request at step S53, judges whether the BT communication section 35 has received a notice of permission or a notice of prohibition as the result of the processes at steps S54 to S63. When the BT communication section 35 has received a notice of permission, the processing goes to step S66. On the other hand, when the BT communication section 35 has received a notice of prohibition, the cell-phone 3 completes the fourth stage of operation.

At step S65, the control section 21-1 of the first MFP 2-1 searches the transferred e-mail table shown by FIG. 8 for the e-mail address included in the forwarding request and specifies the title of an e-mail of which addressee is the e-mail address. Then, the e-mail with the specified title is read out from the exclusive box. Further, the control section 21-1 of the first MFP 2-1 commands the BT communication section 25-1 to start sending the e-mail to the cell-phone 3. Specifically, the forwarding request from the cell-phone 3 includes the e-mail address "a@A.ne.jp", and the control section 21-1 searches the transferred e-mail table for e-mails addressed to "a@A.ne.jp", and the control section 21-1 finds out that the title of an e-mail to be forwarded is "Conference". Then, the control section 21-1 reads out an e-mail titled "Conference" from the exclusive box for "a@A.ne.jp" and commands the BT communication section 25-1 to send the e-mail to the cell-phone 3. The BT communication section 35 starts receiving the e-mail (step S66).

After the start of sending the e-mail, the control section 21-1 of the first MFP 2-1 stands by while detecting the e-mail sending has been completed (step S67). When the e-mail sending has been completed, the processing goes to step S68, where the control section 21-1 of the first MFP 2-1 deletes the exclusive box for the e-mail address "a@A.ne.jp" from the storage section 22-1. Thereby, the first MFP 2-1 completes the fourth stage.

Meanwhile, after the start of receiving the e-mail, the control section 31 of the cell-phone 3 stands by while detecting the e-mail receiving has been completed (step S69). When the e-mail receiving has been completed, the cell-phone 3 completes the fourth stage. Thus, at the fourth stage, the cell-phone 3 receives an e-mail from the first MFP 2-1.

As described above, in the communication system according to the first embodiment of the present invention, if the communication condition between the cell-phone 3 and the base station 1 becomes bad while the base station 1 is sending an e-mail to the cell-phone 3, the e-mail is transferred to the first MFP 2-1 and is stored therein. Therefore, without returning to a service area, the user of the cell-phone 3 receives the e-mail from the first MFP 2-1. The communication system is especially advantageous in that if the user of the cell-phone 3 must stay in a non-service area for a long time, the user can receive the e-mail by moving to the nearby MFP 2-1 located in the non-service area.

In this embodiment, in accordance with the position information sent from the cell-phone 3, the base station 1 sends a map of an area around the current position of the cell-phone 3. However, the map sent to the cell-phone 3 is not limited to a map of an area around the current position of the cell-phone 3. For example, after step S17 shown in FIG. 10, the user may specify an area by use of the input section 37 of the cell-phone 3, and the radio communication section 34 of the cell-phone 3 may send the area as inputted position information to the base station 1. In this case, at step S19, the control section 11 of the base station 1 searches the map data for the inputted area instead of an area around the current position of the cell-phone 3. With this arrangement, if the user must move to another distant non-service area immediately, the user can receive the e-mail from an MFP 2 which exists in the distant non-service area by designating the MFP 2 located in the non-service area. Also, the e-mail transfer service offered by the system may be such that whenever the communication condition between the base station 1 and the cell-phone 3 becomes bad during e-mail sending, the base station transfers the e-mail to an MFP 2 designated by the user of the cell-phone 3 beforehand.

In the first embodiment, when the communication condition between the base station 1 and the cell-phone 3 becomes bad, the base station 1 sends a map to the cell-phone 3. However, for example, when the battery of the cell-phone 3 runs almost out of electricity, the base station 1 may send a map to the cell-phone 3. The cell-phone 3 consumes less electricity for short-distance wireless communication with an MFP 2 than for communication with the base station 1. Therefore, with the arrangement wherein the base station 1 sends a map to the cell-phone 3 when the battery of the cell-phone 3 runs almost out of electricity, even if the electricity in the battery of the cell-phone 3 becomes small, the user of the cell-phone 3 can receive an e-mail from the base station 1 via the MFP 2 by making a transfer request and a forwarding request.

Second Embodiment

A communication system according to the second embodiment of the present invention is described with reference to the accompanying drawings. The communication system according to the second embodiment is basically of the same structure as that of the first embodiment shown by FIG. 1. The base station 1, the MFP 2 and the cell-phone 3 are basically of the same structure as those of the first embodiment shown by FIGS. 2, 3 and 4.

[General Structure]

The communication system according to the second embodiment is to carry out a transfer service as will be described below. In response to a request from the cell-phone 3, the base station 1 sends a map showing the location of an MFP 2 existing near the cell-phone 3 to the cell-phone 3. The user of the cell-phone 3 moves to the MFP 2. Further, the user sends a transfer request, which is to request the base station 1 to transfer e-mails to the MFP 2, to the MFP 2 by short-distance wireless communication. The MFP 2 sends the transfer request to the base station 1, and the base station 1 sends e-mails addressed to the cell-phone 3 to the MFP 2. The MFP 2 sends the e-mails sent from the base station 1 to the cell-phone 3 by short-distance wireless communication. The structures of the base station 1, the MFP 2 and the cell-phone 3 are described.

The cell-phone 3, as in the first embodiment, recognizes the current position of itself and sends position information to the base station 1 at regular time intervals. For this purpose, the sections of the cell-phone 3 and the sections of the base station 1 work in the ways as described in connection with the first embodiment, and descriptions of the functions of the sections are omitted.

The base station 1 is stored with e-mails sent from other communication terminals, including e-mails addressed to the cell-phone 3. Specifically, the e-mails are stored in the storage section 12 of the base station 1. The storage section 12 of the base station 1 is further stored with a sending table as shown by FIG. 7. The sending table is to list e-mails which have yet to send to cell-phones, and in the sending table, in connection with the individual e-mails, addresses (e-mail addresses of cell-phones), titles and names of MFPs designated as transfer destinations are recorded. The sending table is of the same structure as that of the sending error table described in the first embodiment, and FIG. 7 also shows the sending table.

As in the first embodiment, the base station 1 sends a composite map wherein the location of an MFP 2 is marked in a map of an area around the current position of the cell-phone 3 to the cell-phone 3. In the second embodiment, the sending of the map is not triggered by a change for the worse in the communication condition between the base station 1 and the cell-phone 3 but triggered by a request from the cell-phone 3. For this purpose, the radio communication section 34 of the cell-phone 3 works to send a request for a map. Also, the radio communication section 13 of the base station 1 works to receive the request for a map. The storage section 12 of the base station 1 is stored with map data, a user management table as shown by FIG. 5 and an MFP management table as shown by FIG. 6. The user management table and the MFP management table in the second embodiment are the same as those in the first embodiment, and descriptions of these tables are omitted.

The control section 11 of the base station 1 recognizes the current position of the cell-phone 3 with reference to the user management table shown by FIG. 5 and searches the map data for an area around the current position of the cell-phone 3. The control section 11 specifies MFPs 2 existing in a specified range from the current position of the cell-phone 3 with reference to the MFP management table.

Further, the control section 11 of the base station 1 makes a composite map by marking the locations of the specified MFPs 2 in the searched area map. Then, the radio communication section 13 of the base station 1 sends the composite map to the cell-phone 3.

The radio communication section 34 of the cell-phone 3 receives the composite map. Then, the display section 36 of the cell-phone 3 displays the composite map.

In front of the MFP 2, the cell-phone 3 makes a transfer request to the base station 1 to send the transfer request to the base station 1 via the MFP 2, and the transfer request includes at least the e-mail address and the ID number of the cell-phone 3. For this purpose, the BT communication section 35 of the cell-phone 3 sends the transfer request to the MFP 2, and the MFP 2 sends the transfer request further to the base station 1. The optical communication section 14 of the base station 1 receives the transfer request from the cell-phone 3 via the MFP 2.

When the base station 1 receives a transfer request, the base station 1 sends e-mails of which addressees are the e-mail address included in the transfer request to the MFP 2. For this purpose, the optical communication section 14 of the base station 1 sends the e-mails to the MFP 2.

The MFP 2 is stored with the e-mails sent from the base station 1 and sends the e-mails, which are addressed to the cell-phone 3, to the cell-phone 3. For this purpose, the optical communication section 24 of the MFP 2 receives the e-mails from the base station 1. The storage section 22 of the MFP 2 is stored with the e-mails and also is stored with a transferred e-mail table as shown by FIG. 8 which is a list of e-mails stored in the storage section 22. The transferred e-mail table in the second embodiment is the same as that in the first embodiment, and a description thereof is omitted. The BT communication section 25 of the MFP 2 searches e-mails addressed to the cell-phone 3 with reference to the transferred e-mail table and sends the e-mails to the cell-phone 3.

[Operation of the Communication System]

Operation of the communication system of the above-described structure is hereinafter described with reference to the accompanying drawings. The communication system operates through the following three stages: (1) a first stage wherein the base station 1 receives information from the cell-phone 3 periodically on the current position and on the communication condition of the cell-phone 3; (2) a second stage wherein the cell-phone 3 receives a composite map of an area around the current position of the cell-phone 3 from the base station; and (3) a third stage wherein the base station 1 transfers e-mails to the MFP 2, and the cell-phone 3 receives the e-mails from the MFP 2. In the following paragraphs, a case wherein the base station 1 transfers e-mails addressed to the cell-phone 3 to the first MFP 2-1 is described.

Figure 14:
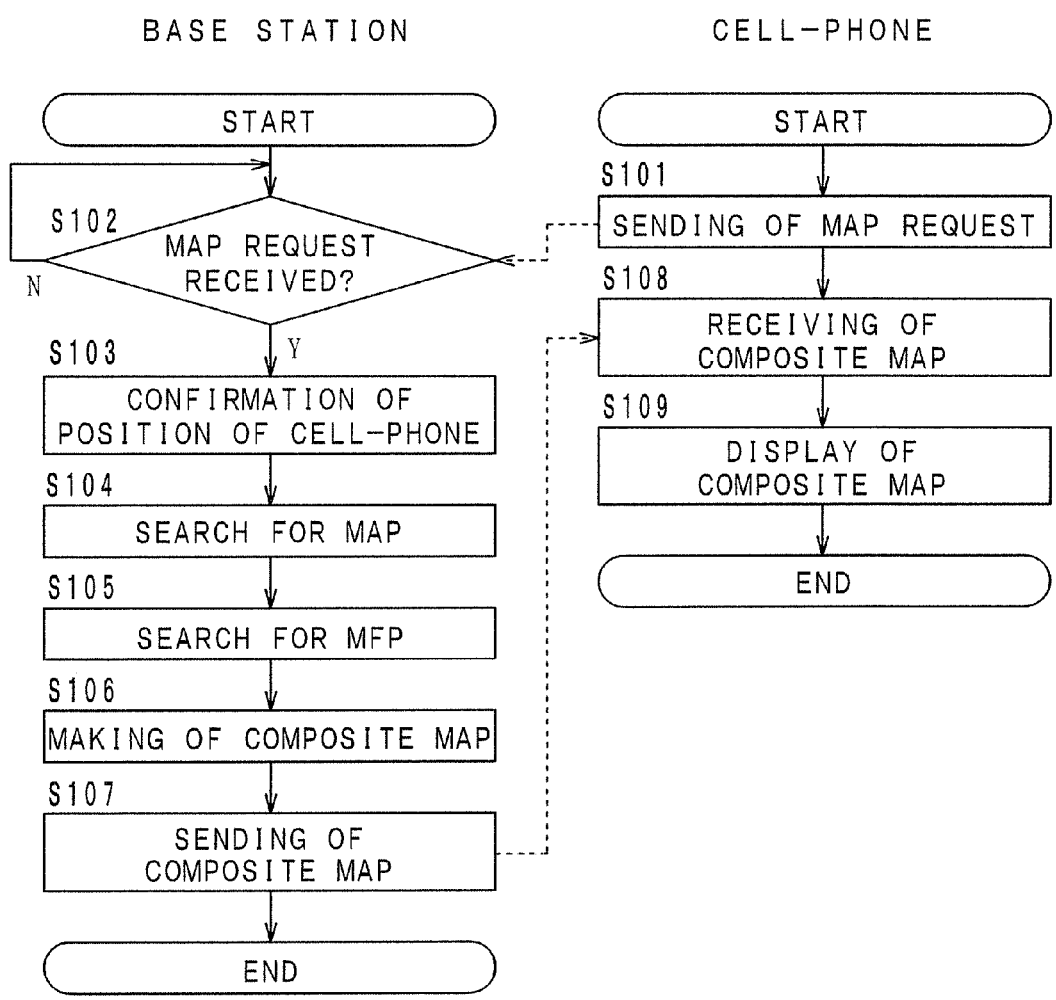
FIG. 14 is a flowchart showing a procedure carried out by the base station and a procedure carried out by the cell-phone at the second stage of operation according to the second embodiment.
Figure 15:
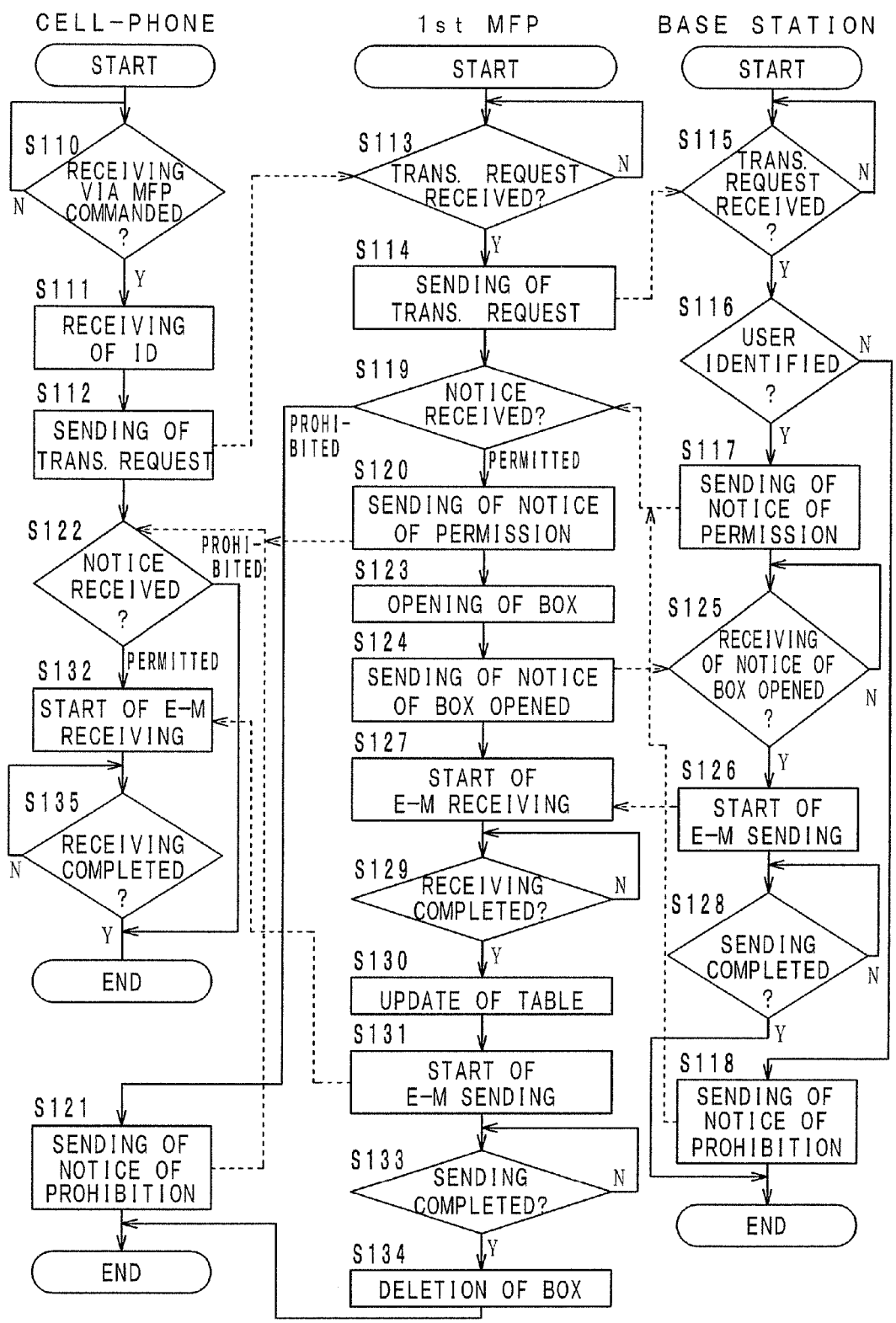
FIG. 15 is a flowchart showing a procedure carried out by the base station and a procedure carried out by the first MFP at the third stage of operation according to the second embodiment.

FIG. 14 is a flowchart showing a procedure carried out by the base station 1 and a procedure carried out by the cell-phone 3 at the second stage. FIG. 15 is a flowchart showing a procedure carried out by the base station 1, a procedure carried out by the first MFP 2-1 and a procedure carried out by the cell-phone 3 at the third stage. The first stage of operation in the second embodiment is the same as the first stage of operation in the first embodiment (see FIG. 9), and a description thereof is omitted. The control sections 11, 21-1 and 31 of the base station 1, the first MFP 2-1 and the cell-phone 3 may carry out the procedures in the flowcharts by executing software programs stored in the storage sections 12, 22-1 and 32 or by using hardware circuits provided for exclusive purposes.

[Second Stage]

Referring to FIG. 14, the second stage of operation is described. The user of the cell-phone 3 operates the cell-phone 3 to send a map request to the base station 1 so as to obtain a map of an area around the current position. Thereby, the control section 31 of the cell-phone 3 commands the radio communication section 34 to send a map request to the base station 1 (step S101).

The control section 11 of the base station 1 stands by while detecting the radio communication section 13 has received a map request (step S102). When the radio communication section 13 has received a map request, the processing goes to step S103. The processes at steps S103 to S109 are the same as the processes at steps S18 to S24 (shown in FIG. 10) carried out in the first embodiment, and descriptions of the processes are omitted. Through these steps, the user of the cell-phone 3 knows the locations of nearby MFPs 2.

[Third Stage]

Next, referring to FIG. 15, the third stage of operation is described. When the second stage is completed, the user of the cell-phone 3 moves to the nearby first MFP 2-1 referring to the composite map as shown by FIG. 13. Then, the user operates the cell-phone 3 to activate an exclusive application for the transfer service offered by the inventive communication system. When the application starts, the control section 31 of the cell-phone 3 commands the display section 36 to display a screen to promote the user to make a command to receive e-mails via the first MFP 2-1. The control section 31 stands by while detecting whether the user has made a command to receive e-mails via the first MFP 2-1 (step S110). When the user has made an e-mail receiving command, the processing goes to step S111.

When the user has made an e-mail receiving command, the control section 31 of the cell-phone 3 commands the display section 36 to display a screen to promote the user to input an ID number. Then, the user inputs his/her ID number "1234" by use of the input section 37. As in the first embodiment, the ID number is a four-digit number shown in the user management table of FIG. 5. By the input from the user, the control section 31 receives the ID number (step S111).

The control section 31, which has obtained the ID number, commands the BT communication section 35 to send a transfer request to the first MFP 2-1 (step S112). The transfer request includes at least the ID number "1234" and the e-mail address of the cell-phone 3 "a@A.ne.jp". Meanwhile, the control section 21-1 of the first MFP 2-1 stands by while detecting whether the BT communication section 25-1 has received a transfer request (step S113). When the BT communication section 25-1 has received a transfer request, the processing goes to step S114.

The control section 21-1 of the first MFP 2-1 commands the optical communication section 24-1 to send the transfer request which the first MFP 2-1 received at step S113 to the base station 1 (step S114). Thereafter, the processing goes to step S115. The processes at steps S115 to S118 are the same as the processes at steps S57 to S60 (shown in FIG. 12) carried out in the first embodiment, and descriptions of these processes are omitted.

At step S119, the control section 21-1 of the first MFP 2-1 judges whether the optical communication section 24-1 has received a notice of permission or a notice of prohibition as the result of identification of the user at steps S115 to S118. When the optical communication section 24-1 has received a notice of prohibition, the processing goes to step S121. When the optical communication section 24-1 has received a notice of permission, the processing goes to step S120.

When the optical communication section 24-1 has received a notice of prohibition, the control section of the first MFP 2-1 commands the BT communication section 25-1 to send a notice of prohibition to the cell-phone 3 to notify the user that the transfer is not permitted (S121). After sending the notice of prohibition, the first MFP 2-1 completes the third stage.

On the other hand, when the optical communication section 24-1 has received a notice of permission, the control section 21 of the first MFP 2-1 commands the BT communication section 25-1 to send a notice of permission to the cell-phone 3 to notify the user that the transfer is permitted (step S120).

At step S122, the control section 31 of the cell-phone 3, after sending the transfer request at step S112, judges whether the BT communication section 35 has received a notice of permission or a notice of prohibition as the result of the processes at steps S113 to S121. When the BT communication section 35 has received a notice of permission, the processing goes to step S132. When the BT communication section 35 has received a notice of prohibition, the cell-phone 3 completes the third stage.

The control section 21-1 of the first MFP 2-1, after sending a notice of permission at step S120, opens an exclusive box for e-mails addressed to the cell-phone 3 (step S123). Thereafter, the control section 21-1 notifies the base station 1 via the optical communication section 24-1 that an exclusive box has been opened (step S124). The processes at steps S123 and S124 are the same as the processes at steps S35 and S36 (shown in FIG. 11) carried out in the first embodiment, and descriptions of these processes are omitted.

The control section 11 of the base station 1, after sending a notice of permission at step S117, stands by while detecting whether the optical communication section 14 has received a notice of opening of an exclusive box from the first MFP 2-1 (step S125). When the optical communication section 14 has received the notice, the processing goes to step S126.

Next, the control section 11 of the base station 1 reads out e-mails addressed to "a@A.ne.jp", which is included in the transfer request, from the storage section 12 and starts sending the e-mails to the first MFP 2-1 (step S126). More specifically, with reference to the sending table shown by FIG. 7, the control section 11 specifies e-mails which are yet to send and which are addressed to "a@A.ne.jp". According to the sending table shown by FIG. 7, there is only one e-mail which is addressed to "a@A.ne.jp" and which is yet to send, and the title of the e-mail is "Conference". The control section 11 reads out the e-mail addressed to "a@A.ne.jp" and titled "Conference" from the storage section 12 and sends the e-mail to the first MFP 2-1, which sent the transfer request at step S114.

The optical communication section 24-1 of the first MFP 2-1 starts receiving the e-mail (step S127). Thereafter, the control section 11 of the base station 1 stands by while detecting the e-mail sending has been completed (step S128). On completion of the e-mail sending, the base station 1 completes the third stage. Meanwhile, the control section 21-1 of the first MFP 2-1 stands by while detecting whether the e-mail receiving is completed (step S129). When the e-mail receiving is completed, the processing goes to step S130.

When the e-mail receiving is completed, the control section 21-1 of the first MFP 2-1 updates the transferred e-mail table (shown by FIG. 8) stored in the storage section 22-1, and more specifically, the control section 21-1 adds the title "Conference" in the row of the e-mail address "a@A.ne.jp" (step S130). If a plural number of e-mails have been sent from the base station 1, the titles of all the e-mails are recorded in the transferred e-mail table. Thereafter, at steps S131 to S135, the e-mail is sent from the first MFP 2-1 to the cell-phone 3. The processes at steps S131 to S135 carried out by the first MFP 2-1 and the cell-phone 3 are the same as the processes at steps S65 to S69 (shown in FIG. 12) carried out in the first embodiment, and descriptions of these processes are omitted. Thus, through the third stage of operation, the cell-phone 3 receives e-mails from the base station 1 via the first MFP 2-1.

As described above, in the communication system according to the second embodiment, an MFP 2 located in a non-service area is connected to the base station 1 to be communicable with the base station 1. Therefore, only by making an access to the MFP 2, the user of the cell-phone 3 can receive e-mails from the base station 1 via the MFP 2 without returning to a service area. The communication system is especially advantageous in that even if the user of the cell-phone 3 must stay in a non-service area for a long time, the user can receive e-mails by moving to the nearby MFP 2 in the non-service area.

In the communication system, in response to a transfer request sent from the cell-phone 3 to the base station 1 via the MFP 2, the base station 1 sends e-mails addressed to the cell-phone 3 to the MFP 2. The MFP 2 stores the e-mails therein and sends the e-mails to the cell-phone 3. In the communication system, the e-mails are sent to the cell-phone 3 immediately after stored in the MFP 2. Once the e-mails have been sent to the cell-phone 3, the e-mails do not have to be stored in the MFP 2. In the communication system, therefore, the e-mails do not have to be stored in the MFP 2 for a long time, and the storage section 22 of the MFP 2 can be of small capacity.

In this embodiment, the user of the cell-phone 3 may input an area by use of the input section 37, and the radio communication section 34 of the cell-phone 3 may send the area as inputted position information. In this case, the control section 11 of the base station 1 searches for a map in accordance with the inputted position information instead of the current position information.

Third Embodiment

A communication system according to a third embodiment of the present invention will be described with reference to the accompanying drawings. The general structure of the communication system according to the third embodiment is the same as that of the first embodiment shown by FIG. 1. The structures of the base station 1, the MFP 2 and the cell-phone 3 are the same as those of the first embodiment shown by FIGS. 2, 3 and 4.

[General Structure]

The communication system according to the third embodiment is to offer a transfer service as described below. At a request of the cell-phone 3, the base station 1 sends a map showing the locations of nearby MFPs 2 to the cell-phone 3. The user of the cell-phone 3 designates an MFP 2 as the transfer destination of e-mails with reference to the map and also designates the term for transfer to the MFP 2. The cell-phone 3 notifies the base station 1 of the designated MFP 2 and the designated term. If the base station 1 receives e-mails addressed to the cell-phone 3 within the term, the base station 1 sends the e-mails to the designated MFP 2 via the optical-fiber cable 5. The user of the cell-phone 3 moves to the designated MFP 2 and receives the e-mails sent from the base station 1. The structures of the base station 1, the MFP 2 and the cell-phone 3 are described below.

The cell-phone 3, as in the first embodiment, recognizes the current position of itself at regular time intervals and sends position information to the base station 1. The functions of the sections of the base station 1 and the cell-phone 3 for the operation are the same as those in the first embodiment, and detailed descriptions are omitted.

At a request of the cell-phone 3, the base station 1 sends a composite map of an area around the current position of the cell-phone 3 showing the locations of nearby MFPs 2. In the third embodiment, as in the second embodiment, the sending of a map is not triggered by the factor that the communication condition between the cell-phone 3 and the base station 1 becomes bad and is triggered by a request from the cell-phone 3. For this purpose, the radio communication section 34 of the cell-phone 3 sends a request for a map. The radio communication section 13 of the base station 1 receives the request for a map. The storage section 12 of the base station 1 is stored with map data, a user management table as shown by FIG. 5 and an MFP management table as shown by FIG. 6. The user management table and the MFP management table are the same as those in the first embodiment, and descriptions of these tables are omitted.

The control section 11 of the base station 1 recognizes the current position of the cell-phone 3 with reference to the user management table and searches the map data for an area around the current position of the cell-phone 3. The control section 11 further specifies nearby MFPs 2 located within a specified range from the current position of the cell-phone 3 with reference to the MFP management table.

The control section 11 of the base station makes a composite map by marking the locations of the specified MFPs 2 in the searched area map. Then, the radio communication section 13 sends the composite map to the cell-phone 3. The radio communication section 34 of the cell-phone 3 receives the composite map, and the display section 36 of the cell-phone 3 displays the composite map.

The user of the cell-phone 3 selects one from the MFPs 2 shown in the composite map and inputs a term for transfer of e-mails to the MFP 2. Then, the cell-phone 3 sends the name of the selected MFP 2 and the inputted term to the base station 1. For this purpose, the radio communication section 34 of the cell-phone 3 sends a transfer request including the name of the selected MFP 2 as a transfer destination and the inputted term as a transfer term to the base station 1.

During the transfer term, when the base station 1 receives e-mails addressed to the cell-phone 3, the base station 1 transfers the e-mails to the selected MFP 2. For this purpose, the storage section 12 is stored with a transfer management table as shown by FIG. 16. In the transfer management table, in connection with e-mail addresses of individual cell-phones, transfer terms and names of selected, MFPs are recorded. The transfer management table is made based on transfer terms and names of selected MFPs sent from cell-phones 3. The optical communication section 14, with reference to the transfer management table, transfers e-mails addressed to the cell-phone 3 to the selected MFP 2 only during the transfer term.

The MFP 2 stores the e-mails addressed to the cell-phone 3 sent from the base station 1 therein and sends the e-mails to the cell-phone 3 in response to a request from the cell-phone 3 only during the transfer term. For this purpose, the optical communication section 24 of the MFP 2 receives e-mails from the base station 1. The storage section 22 of the MFP 2 stores the e-mails therein, and the storage section 22 is also stored with a transferred e-mail table as shown by FIG. 8 and a term management table as shown by FIG. 17. The transferred e-mail table is the same as that in the first embodiment, and a description thereof is omitted. The term management table is to manage the transfer term designated for each cell-phone, and in the term management table, in connection with e-mail addresses of individual cell-phones, transfer terms for the respective cell-phones are recorded. The BT communication section 25 of the MFP 2 sends e-mails addressed to the cell-phone 3 to the cell-phone 3 with reference to the transferred e-mail table only during the transfer term.

[Operation of Communication System]

Operation of the communication system of the above-described structure is hereinafter described with reference to the accompanying drawings. The communication system operates through the following four stages: (1) a first stage wherein the base station 1 receives information from the cell-phone 3 periodically on the current position and on the communication condition of the cell-phone 3; (2) a second stage wherein the cell-phone 3 receives a composite map of an area around the current position of the cell-phone 3 from the base station 1 and notifies the base station 1 of an MFP 2 selected by the user with reference to the composite map; (3) a third stage wherein the base station 1 transfers e-mails to the MFP 2; and (4) a fourth stage wherein the cell-phone 3 receives the e-mails from the MFP 2. In the following paragraphs, a case wherein e-mails addressed to the cell-phone 3 are transferred to the first MFP 2-1 is described.

Figure 18:
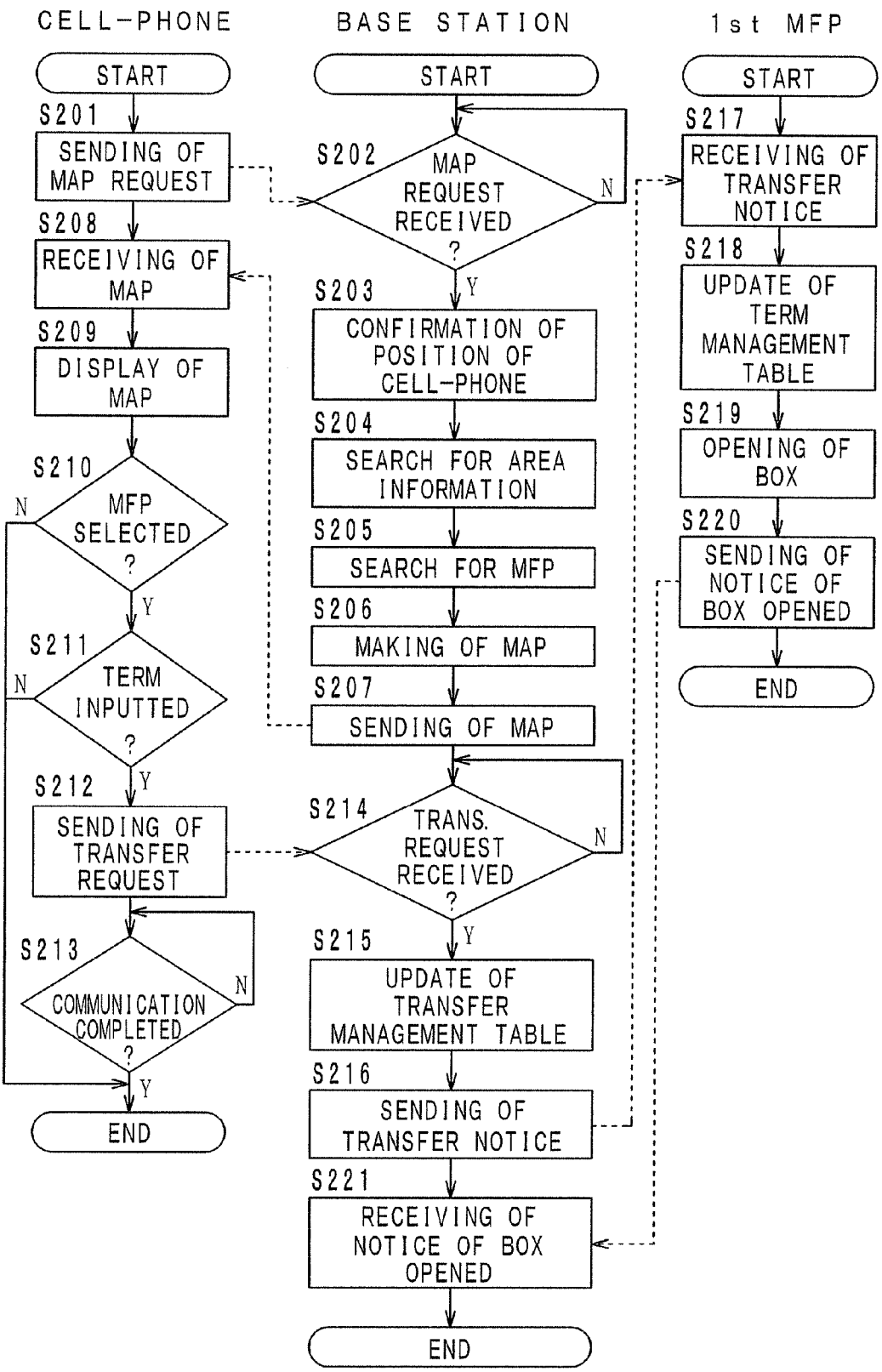
FIG. 18 is a flowchart showing a procedure carried out by the base station, a procedure carried out by the first MFP and a procedure carried out by the cell-phone at the second stage of operation according to the third embodiment.
Figure 19:
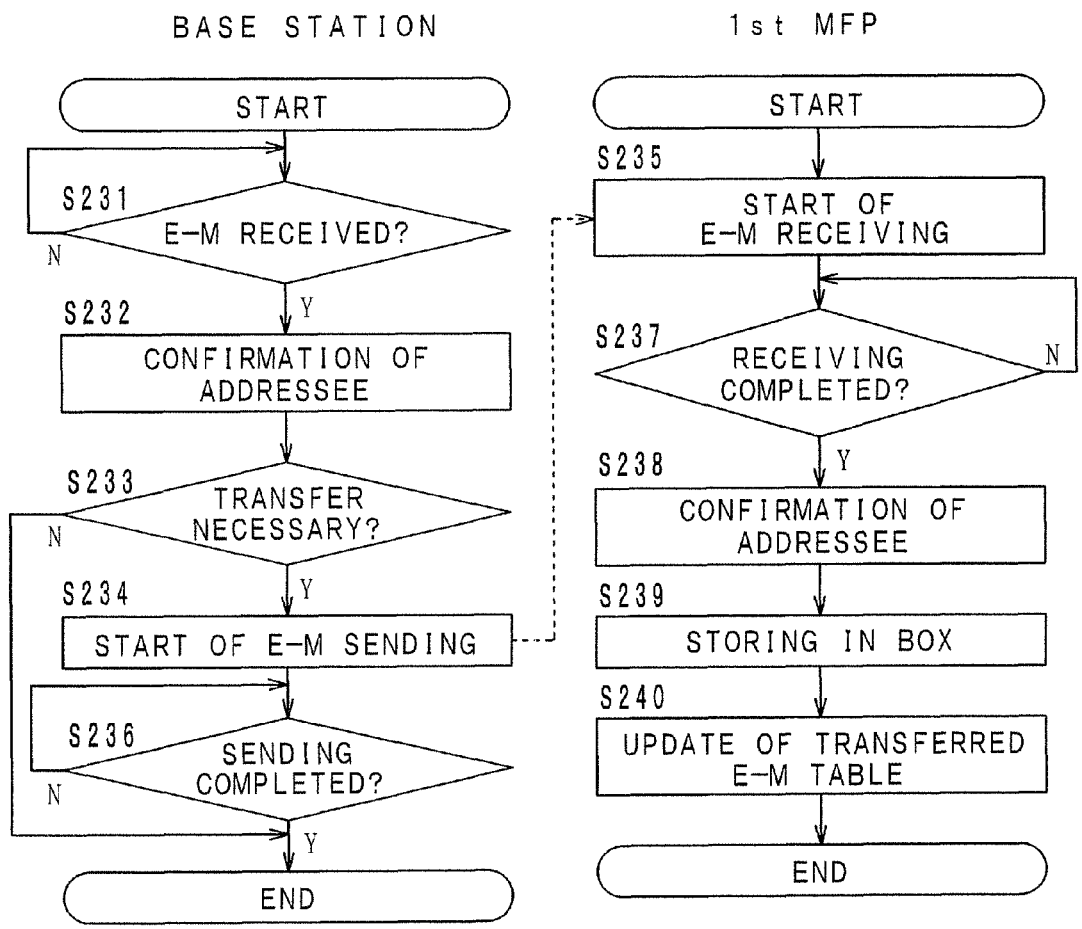
FIG. 19 is a flowchart showing a procedure carried out by the base station and a procedure carried out by the first MFP at the third stage of operation according to the third embodiment.
Figure 20:
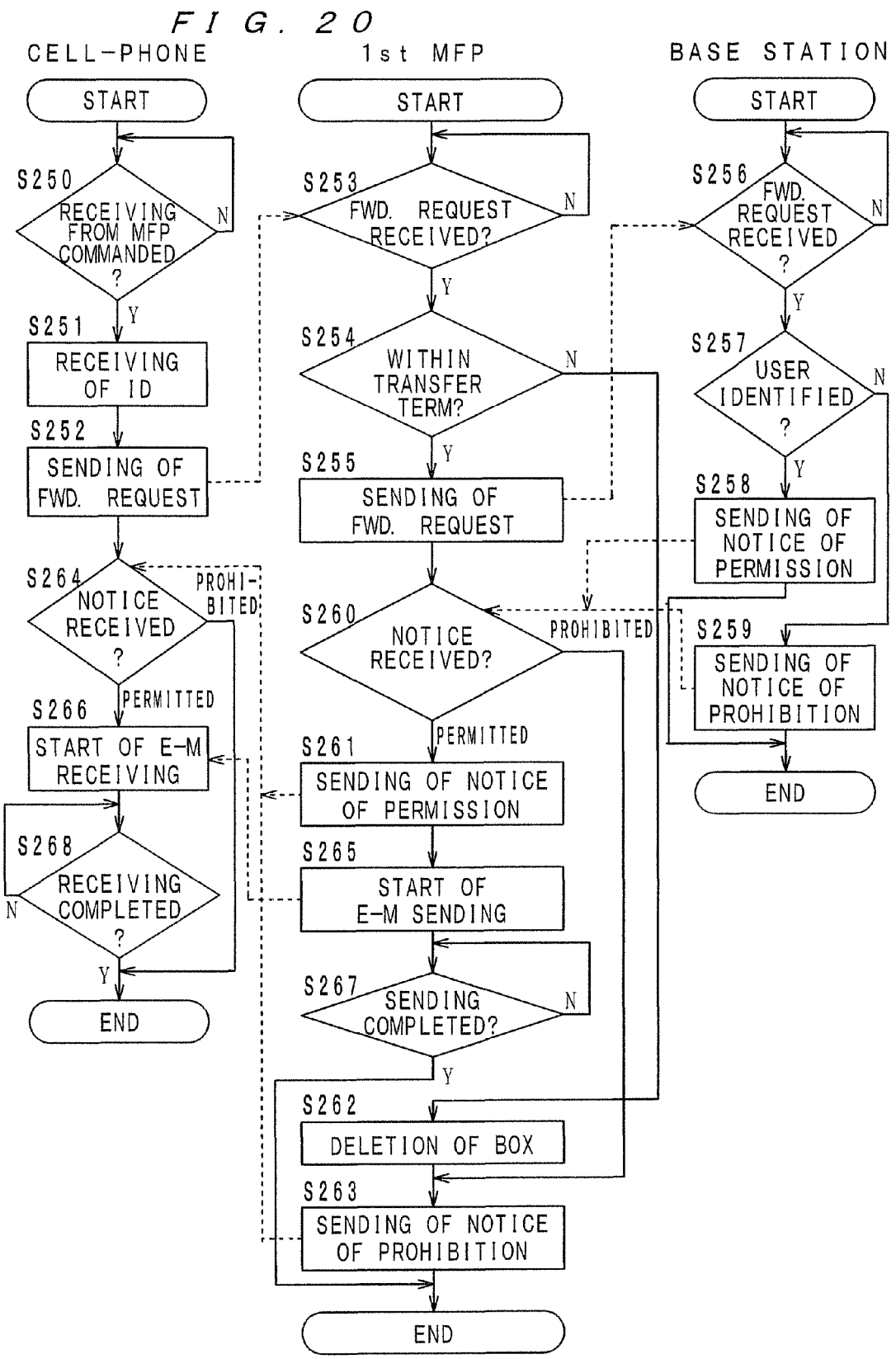
FIG. 20 is a flowchart showing a procedure carried out by the base station, a procedure carried out by the first MFP and a procedure carried out by the cell-phone at the fourth stage of operation according to the third embodiment.

FIG. 18 is a flowchart showing a procedure carried out by the base station 1, a procedure carried out by the first MFP 2-1 and a procedure carried out by the cell-phone 3 at the second stage. FIG. 19 is a flowchart showing a procedure carried out by the base station 1 and a procedure carried out by the first MFP 2-1 at the third stage. FIG. 20 is a flowchart showing a procedure carried out by the base station 1, a procedure carried out by the first MFP 2-1 and a procedure carried out by the cell-phone 3 at the fourth stage. The first stage in the third embodiment is the same as the first stage in the first embodiment (shown by FIG. 9), and a description thereof is omitted. The control sections 11, 21-1 and 31 of the base station 1, the first MFP 2-1 and the cell-phone 3 may carry out the procedures in the flowcharts by executing software programs stored in the storage sections 12, 22-1 and 32 or by using hardware circuits provided for exclusive purposes.

[Second Stage]

Referring to FIG. 18, the second stage of operation is described. The user of the cell-phone 3 operates the cell-phone 3 to send a request for a map to the base station 1 so as to obtain a map of an area around the current position. With this operation, the control section 31 of the cell-phone 3 commands the radio communication section 34 to send a request for a map to the base station 1 (step S201).

Figure 21:
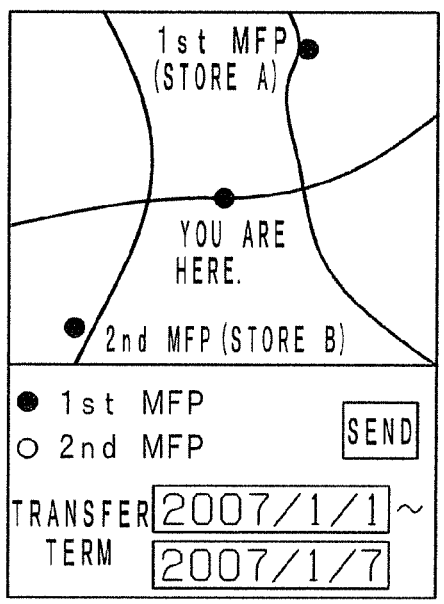
FIG. 21 is an illustration of a composite map.

The control section 11 of the base station 1 stands by while detecting whether the radio communication section 13 has received a request for a map (step S202). When the radio communication section 13 has received a request for a map, the processing goes to step S203. At step S203, the base station 1 recognizes the current position of the cell-phone 3, and through steps S204 to S207, the base station 1 makes a composite map. Then, the cell-phone 3 displays the composite map as shown by FIG. 21 through steps S208 and S209. The processes at steps S203 to S209 are the same as the processes at steps S18 to S24 (shown in FIG. 10) carried out in the first embodiment, except that a picture for designating a term for transfer is further combined with the map at step S209. Therefore, descriptions of these processes are omitted. Through these steps, the user of the cell-phone 3 recognizes the locations of the first MFP 2-1 and the second MFP 2-2 near the current position.

Next, the control section 31 of the cell-phone 3 judges whether the user has selected the first MFP 2-1 or the second MFP 2-2 as the transfer destination of e-mails (step S210). In this moment, the user selects the first MFP 2-1 by use of the input section 37 with reference to the selection section below the composite map (see FIG. 21). Thereby, the control section 31 judges that the first MFP 2-1 has been selected, and the processing goes to step S211. On the other hand, when no MFP 2 is selected, the cell-phone 3 completes the second stage.

After the selection of MFP 2, the control section 31 judges whether the user has inputted a term for transfer of e-mails (step S211). In this moment, the user inputs a term for transfer of e-mails in the lower section of the composite map (see FIG. 21) by use of the input section 37 and presses the "SEND" button. Thereby, the control section 31 judges that an input of a term has been made, and the processing goes to step S212. On the other hand, when an input of a term is not made, the cell-phone 3 completes the second stage.

When an input of a term is made and the "SEND" button is pressed, the control section 31 of the cell-phone 3 commands the radio communication section 34 to send the name of the selected MFP 2, the inputted term and the e-mail address of the cell-phone 3 to the base station 1 as a transfer request (step S212). In the composite map shown by FIG. 21, the first MFP 2-1 is selected, and a term from Jan. 1, 2007 to Jan. 7, 2007 is inputted as the transfer term. Accordingly, the radio communication section 34 sends a transfer request including "the first MFP" as the name of a selected MFP and "from Jan. 1, 2007 to Jan. 7, 2007" as the transfer term. The control section 31 stands by while judging whether the communication with the base station 1 has been completed (step S213). When the user has cut the communication between the cell-phone 3 and the base station 1, the cell-phone 3 completes the second stage.

Meanwhile, the control section 11 of the base station 1 stands by while detecting whether the radio communication section 13 has received a transfer request including an MFP name and a transfer term from the cell-phone 3 (step S214). When the radio communication section 13 has received a transfer request, the processing goes to step S215.

When the base station 1 has received a transfer request, the control section 11 records the e-mail address of the cell-phone 3 "a@A.ne.jp" in the transfer management table shown by FIG. 16. Further, the control section 11 records "the first MFP" as the transfer destination and "from Jan. 1, 2007 to Jan. 7, 2007" as the transfer term, which are included in the transfer request, in the row of the e-mail address "a@A.ne.jp" (step S215).

Next, the control section 11 of the base station 1 commands the optical communication section 14 to send a transfer notice to the first MFP 2-1 (step S216). The transfer notice is to notify the first MFP 2-1 that e-mails addressed to the cell-phone 3 will be transferred to the first MFP 2-1 for a specified term, and the notice includes the e-mail address "a@A.ne.jp" and the term "from Jan. 1, 2007 to Jan. 7, 2007". The optical communication section 24-1 of the first MFP 2-1 receives the transfer notice (step S217).

Then, the control section 21-1 of the first MFP 2-1 updates the term management table shown by FIG. 17 (step S218). Specifically, the control section 21-1 records "a@A.ne.jp" as the e-mail address and "from Jan. 1, 2007 to Jan. 7, 2007" as the transfer term in the term management table.

Next, the control section 21-1 of the first MFP 2-1 opens an exclusive box for the e-mail address "a@A.ne.jp", which is included in the transfer notice, in the storage section 22-1 (step S219). After opening the exclusive box, the control section 21-1 notifies the base station 1 via the optical communication section 24-1 that an exclusive box has been opened (step S220). The optical communication section 14 of the base station 1 receives the notice (step S221). Thus, an exclusive box is opened in the MFP 2, and a term of using the box is designated.

[Third Stage]

Next, referring to FIG. 19, the third stage of operation is described. The control section 11 of the base station 1 stands by while detecting whether the base station 1 has received an e-mail (step S231). When the base station 1 has received an e-mail, the processing goes to step S232.

When the base station 1 has received an e-mail, the control section 11 confirms the addressee of the e-mail (step S232). Then, the control section 11 judges whether the e-mail must be transferred (step S233). Specifically, the control section 11 judges whether the addressee of the e-mail is in the list of the transfer management table and whether the current date and time is within the transfer term for the addressee. For example, when the received e-mail is addressed to "a@A.ne.jp", which is in the transfer management table, and when the current date and time is within the term from Jan. 1, 2007 to Jan. 7, 2007, the control section 11 judges that the e-mail must be transferred. When it is necessary to transfer the e-mail, the processing goes to step S234. When it is not necessary to transfer the e-mail, the base station 1 completes the third stage.

When transfer of the e-mail is necessary, the control section 11 of the base station 1 specifies a transfer destination with reference to the transfer management table shown by FIG. 16. Specifically, when the addressee of the e-mail is "a@A.ne.jp", the control section 11 specifies "the first MFP" as the transfer destination with reference to the transfer management table. Thereafter, the control section 11 commands the optical communication section 14 to start sending the e-mail to the first MFP 2-1 (step S234). The optical communication section 24-1 of the first MFP 2-1 starts receiving the e-mail (step S235).

Thereafter, the control section 11 of the base station 1 stands by while detecting whether the e-mail sending has been completed (step S236). On completion of the sending, the base station 1 completes the third stage.

Meanwhile, the control section 21-1 of the first MFP 2-1 stands by while detecting whether the e-mail receiving has been completed (step S237). On completion of the receiving, the processing goes to step S238.

When the e-mail receiving is completed, the control section 21-1 of the first MFP 2-1 confirms the addressee of the e-mail (step S238). Next, the control section 21-1 stores the e-mail in the exclusive box for the addressee (step S239). Specifically, when the control section 21-1 confirms that the received e-mail is addressed to "a@A.ne.jp", the control section 21-1 stores the e-mail in the exclusive box for "a@A.ne.jp".

Finally, the control section 21-1 of the first MFP 2-1 updates the transferred e-mail table shown by FIG. 8 by recording the title of the received e-mail (step S240). Specifically, when the received e-mail is addressed to "a@A.ne.jp" and is titled "Conference", the control section 21-1 records the title "Conference" in the row of "a@A.ne.jp" in the transferred e-mail table. Then, the first MFP 2-1 completes the third stage. With the third stage of operation, an e-mail is sent from the base station 1 to the first MFP 2-1.

[Fourth Stage]

Next, referring to FIG. 20, the fourth stage of operation is described. After the second stage of operation, the user of the cell-phone 3 moves to the first MFP 2-1 with reference to the composite map as shown by FIG. 21. Then, the user operates the cell-phone 3 to activate an exclusive application for the e-mail transfer service according to the inventive communication system. After the application starts, the control section 31 of the cell-phone 3 commands the display section 36 to display a screen to promote the user to make a command to receive e-mails from the first MFP 2-1. Then, the control section 31 stands by while detecting whether the user has made a command to receive e-mails from the first MFP 2-1 (step S250). When the user has made a command to receive e-mails, the processing goes to step S251.

The processes at steps S251 to S253 carried out by the cell-phone 3 and the first MFP 2-1 are the same as the processes at steps S52 to S54 (shown in FIG. 12) in the first embodiment, and descriptions of these processes are omitted.

When the first MFP 2-1 has received a forwarding request from the cell-phone 3, the control section 21-1 of the first MFP 2-1 judges whether the current date and time is within the transfer term (step S254). Specifically, it is judged whether the current date and time is within the term "from Jan. 1, 2007 to Jan. 7, 2007" recorded in the term management table in the row of the e-mail address "a@A.ne.jp". When the current time and date is out of the transfer term, the processing goes to step S262. When the current date and time is within the transfer term, the processing goes to step S255.

When the current date and time is out of the transfer term, the control section 21-1 of the first MFP 2-1 deletes the exclusive box for the e-mail address "a@A.ne.jp" from the storage section 22-1 (step S262). Further, the control section 21-1 of the first MFP 2-1 commands the BT communication section 25-1 to send a notice of prohibition to the cell-phone 3 to notify the cell-phone 3 that the e-mail forwarding is not permitted (step S263). Then, the first MFP 2-1 completes the fourth stage.

When the current date and time is within the transfer term, the control section 21-1 of the first MFP 2-1 commands the optical communication section 24-1 to send the forwarding request which the first MFP 2-1 received at step S253 to the base station 1 (S255). Thereafter, the processing goes to step S256. At steps S256 to S259, the processes for user identification are carried out, and the processes are the same as the processes at steps S57 to S60 (shown in FIG. 12) in the first embodiment. Therefore, descriptions of the processes at steps S256 to S259 are omitted.

After the user identification at steps S256 to S259, the control section 21-1 of the first MFP 2-1 stands by while detecting whether the optical communication section 24-1 has received a notice of permission or a notice of prohibition (step S260). When the optical communication section 24-1 has received a notice of permission, the processing goes to step S263. When the optical communication section 24-1 has received a notice of prohibition, the processing goes to step S261.

When the optical communication section 24-1 has received a notice of prohibition, the control section 21-1 of the first MFP 2-1 commands the BT communication section 25-1 to send a notice of prohibition to the cell-phone 3 to notify the cell-phone 3 that the forwarding is prohibited (step S263). After sending the notice of prohibition, the first MFP 2-1 completes the fourth stage.

On the other hand, when the optical communication section 24-1 has received a notice of permission, the control section of the first MFP 2-1 commands the BT communication section 25-1 to send a notice of permission to the cell-phone 3 to notify the cell-phone 3 that the forwarding is permitted (step S261). Thereafter, the processing goes to step S254.

After sending a forwarding request at step S252, the control section 31 of the cell-phone 3 detects whether the BT communication section 35 has received a notice of permission or a notice of prohibition as the result of the processes at steps S253 to S263 (step S264). When the BT communication section 31 has received a notice of permission, the processing goes to step S266. When the BT communication section 31 has received a notice of prohibition, the cell-phone 3 completes the fourth stage.

At step S265, with reference to the transferred e-mail table shown by FIG. 8, the control section 21-1 of the first MFP 2-1 specifies the titles of e-mails to be forwarded by looking into the row of the e-mail address included in the forwarding request which the first MFP 2-1 received at step S253, and the control section 21-1 reads out e-mails with the titles from the exclusive box for the e-mail address. Then, the control section 21-1 of the first MFP 2-1 commands the BT communication section to start sending the e-mails to the cell-phone 3 (step S265). Specifically, the forwarding request from the cell-phone 3 includes the e-mail address "a@A.ne.jp". Accordingly, the control section 21-1 looks into the row of "a@A.ne.jp" in the transferred e-mail table and recognizes that the title of an e-mail to be sent to the cell-phone 3 is "Conference". Then, the control section 21-1 reads out an e-mail titled "Conference" from the exclusive box for the e-mail address "a@A.ne.jp" and commands the BT communication section 25-1 to send the e-mail to the cell-phone 3. The BT communication section 25-1 of the cell-phone 3 starts receiving the e-mail (step S266).

After sending the e-mail, the control section 21-1 of the first MFP 2-1 stands by while detecting the e-mail sending has been completed (step S267). On completion of the e-mail sending, the first MFP 2-1 completes the fourth stage.

Meanwhile, after receiving of the e-mail, the control section 31 of the cell-phone 3 stands by while detecting whether the e-mail receiving has been completed (step S268). On completion of the e-mail receiving, the cell-phone 3 completes the fourth stage. Thus, at the fourth stage, the cell-phone 3 receives e-mails from the first MFP 2-1.

As described above, in the communication system according to the third embodiment, an MFP 2 located in a non-service area is connected to the base station 1 to be communicable with the base station 1. During a designated term, the base station 1 sends e-mails addressed to the cell-phone 3 to the MFP 2, and the e-mails are stored in the MFP 2. Therefore, the user of the cell-phone 3 can receive e-mails from the MFP 2 without returning to a service area. The communication system is especially advantageous in that even if the user of the cell-phone 3 must stay in a non-service area for a long time, the user can receive e-mails by moving to the nearby MFP 2 in the non-service area.

In this embodiment, the user of the cell-phone 3 may input an area by use of the input section 37, and the radio communication section 34 of the cell-phone 3 may send the area as inputted position information. In this case, the control section 11 of the base station 1 searches for a map in accordance with the inputted position information instead of the current position information.

In the first, the second and the third embodiments, the base station 1 recognizes the cell-phone 3 from the e-mail address of the cell-phone 3. However, the recognition may be based on an user's ID peculiarly provided for the cell-phone 3, a machine ID number of the cell-phone 3, the telephone number of the cell-phone 3 or the like, instead of the e-mail address.

In the first, the second and the third embodiments, e-mails are sent from the base station 1 to the cell-phone 3 via the MFP 2. However, the direction of sending e-mail is not limited to this direction, and e-mails may be sent from the cell-phone 3 to the base station 1 via the MFP 2. In this case, the e-mails are further sent from the base station 1 to other communication terminals via internet. Also, the system may be so structured that if the communication condition between the base station 1 and the cell-phone 3 becomes bad while the cell-phone 3 is sending an e-mail to the base station 1, the cell-phone 3 automatically starts short-distance wireless communication with the MFP 2 to send the e-mail to the base station 1 via the MFP 2.

In the first, the second and the third embodiments, after the cell-phone 3 receives e-mails, an accounting operation may be performed by short-distance wireless communication between the MFP 2 and the cell-phone 3. In the accounting operation, the charges for the transfer service are calculated, based on, for example, a number of times of sending e-mails from the MFP 2 to the cell-phone 3, the capacity of the exclusive box, the term of using the exclusive box, etc. The accounting operation may be performed between the base station 1 and the cell-phone 3.

In the first, the second and the third embodiments, the information exchanged between the base station 1 and the MFP 2 via the optical-fiber cable 5 for user identification is preferably encoded.

In the first, the second and the third embodiments, the printing section 23 of the MFP 2 may print e-mails sent from the MFP 2 to the cell-phone 3.

In the second and the third embodiments, the cell-phone 3 obtains a composite map by sending a request for a map to the base station 1. However, the systems may be so structured that when the cell-phone 3 receives a composite map from the base station 1 when the communication condition between the cell-phone 3 and the base station 1 becomes bad, as in the first embodiment.

Fourth Embodiment

Figure 22:
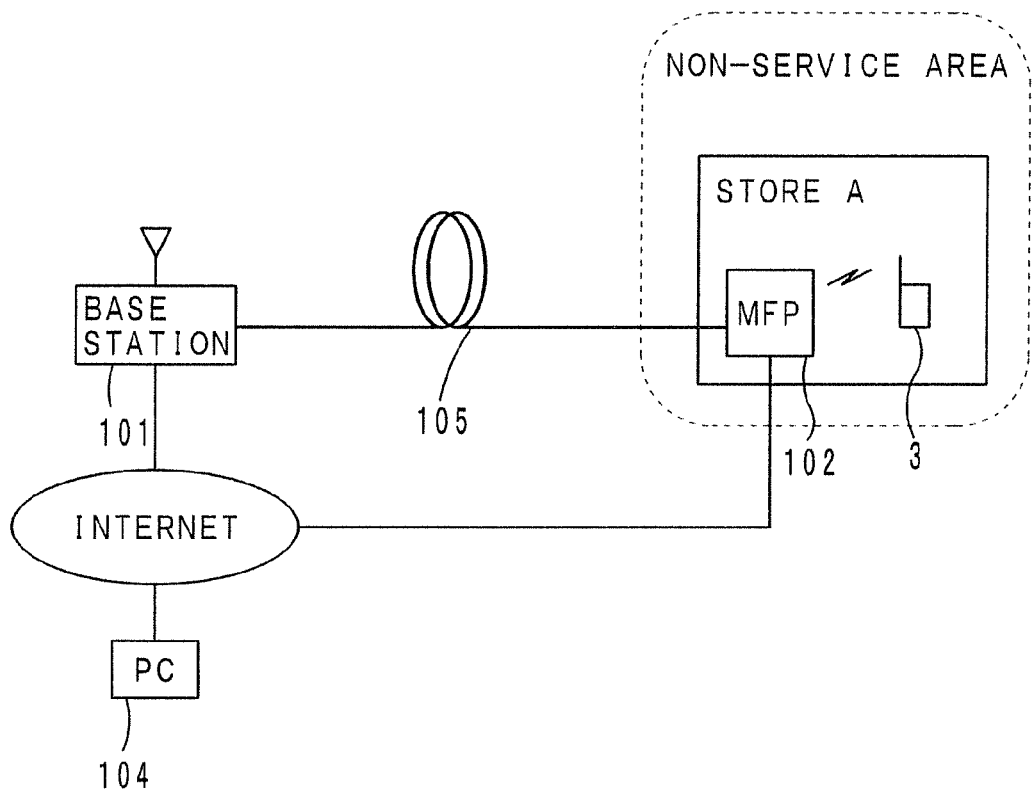
FIG. 22 is a block diagram showing the general structure of a communication system according to the fourth embodiment.
Figure 23:
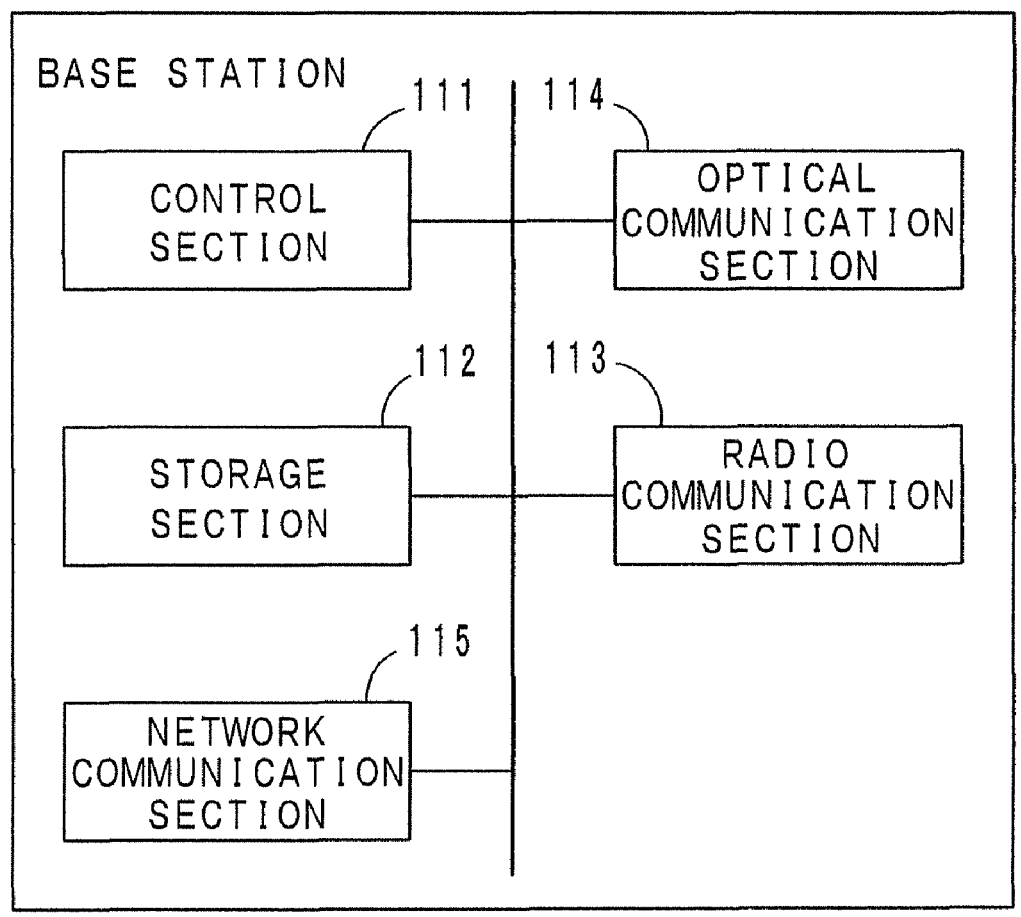
FIG. 23 is a block diagram showing the structure of the base station in the communication system according to the fourth embodiment.
Figure 24:
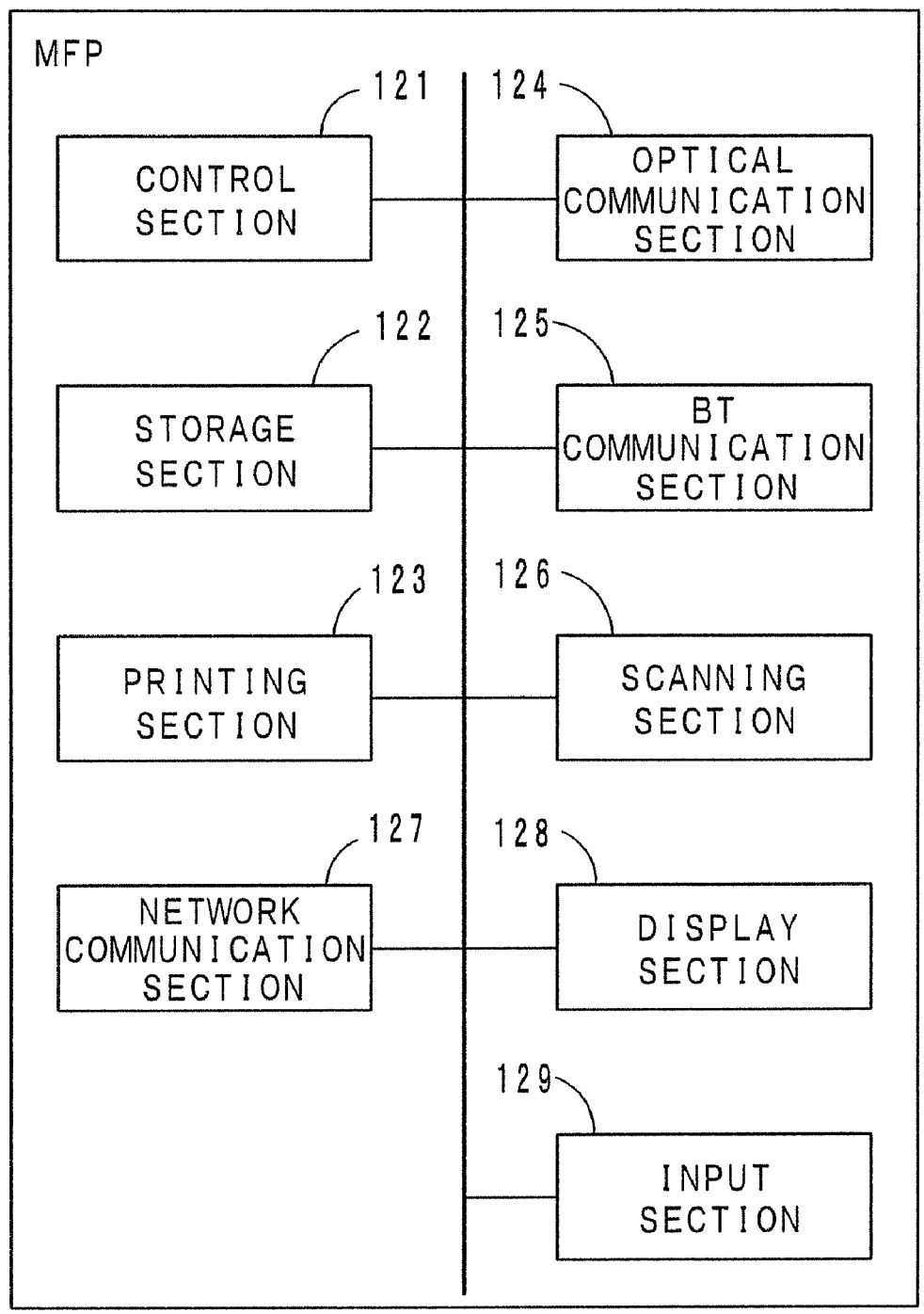
FIG. 24 is a block diagram showing the structure of the MFP in the communication system according to the fourth embodiment.
Figure 25:
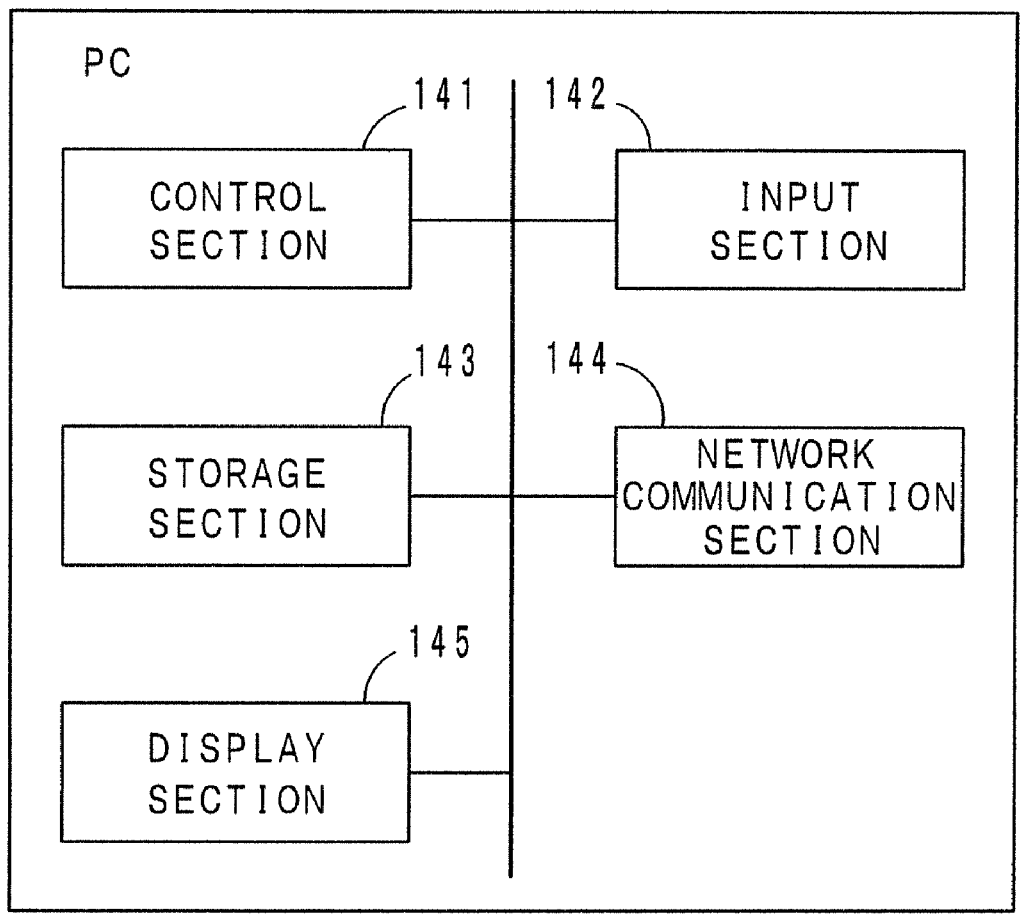
FIG. 25 is a block diagram showing the structure of a personal computer in the communication system according to the fourth embodiment.

A communication system according to the fourth embodiment of the present invention will be described with reference to the accompanying drawings. FIG. 22 shows the general structure of the communication system according to the fourth embodiment. FIG. 23 is a block diagram of a base station 101 in the communication system. FIG. 24 is a block diagram of an MFP 102 in the communication system. FIG. 25 is a block diagram of a personal computer (PC) 104 in the communication system.

[General Structure]

As FIG. 22 shows, the communication system comprises a base station 101, an MFP 102 as an image processing apparatus, a cell-phone 3, a PC 104 and an optical-fiber cable 105.

The communication system according to the fourth embodiment is to offer a transfer service as described below. The cell-phone 3 makes an access to the MFP 102 located in a non-service area by short-distance wireless communication and opens an exclusive box for e-mails addressed to the cell-phone 3 in the MFP 102 designating a term of using the box. For this purpose, the user of the cell-phone 3 sends a list of e-mail addresses recorded in an address note stored in the cell-phone 3 to the MFP 102. The list of e-mail addresses is displayed on a display of the MFP 102, and from the list, the user selects e-mail addresses as senders of e-mails to be transferred to the MFP 102. The MFP 102 sends an addressee changing application to communication terminals (PCs 104) with the selected e-mail addresses via the optical-fiber cable 105 and the base station 101. The addressee changing application is to automatically change the addressee of e-mails to be sent to the cell-phone 3 from the e-mail address of the cell-phone 3 to the e-mail address of the MFP 102. With this application, the PCs 104 send e-mails addressed to the cell-phone 3 to the MFP 102 via internet. The e-mails are stored in the exclusive box for the cell-phone 3 in the MFP 102. Then, the user of the cell-phone 3 receives the e-mails from the MFP 102.

The base station 101 is a relay station of the cell-phone 3 and as shown by FIG. 23, comprises a control section 111 which is specifically a CPU, a storage section 112 which is specifically a hard disk 112, a radio communication section 114 which is a radio communication interface and a network communication section 115 which is a communication interface for permitting communication with other communication devices via internet.

The MFP 102, as shown by FIG. 24, comprises a control section 121 which is specifically a CPU, a storage section 122 which is specifically a hard disk, a printing section 123, an optical communication section 124 which is an optical communication interface, a BT communication section 125 which is a communication interface for permitting a short-distance wireless communication via Blue Tooth (trade name), a scanning section 126, a network communication section 127 which is a communication interface for permitting communication with other communication devices via internet, a display section 128 which is specifically a liquid crystal display and an input section 129 composed of a plural number of buttons.

The structure of cell-phone 3 is the same as the cell-phone 3 in the first embodiment and is shown by FIG. 4, and a description thereof is omitted.

The PC 104, as shown by FIG. 25, comprises a control section 141 which is specifically a CPU, an input section 142 composed of a keyboard and a mouse, a storage section 143 which is specifically a hard disk, a network communication section 144 which is a communication interface for permitting communication with other communication devices via internet and a display section 145 which is specifically a liquid crystal display.

[Operation of the Communication System]

Operation of the communication system of the above-described structure will be described with reference to the accompanying drawings. The communication system operates through the following four stages: (1) a first stage wherein the cell-phone 3 makes an access to the MFP 102 to open an exclusive box in the MFP 102, and the MFP 102 sends an addressee changing application to the PC 104; (2) a second stage wherein the cell-phone 3 makes an access to the MFP 102 to receive e-mails addressed to the cell-phone 3; (3) a third stage wherein the cell-phone 3 makes an access to the MFP 102 to extend the term of using the exclusive box; and (4) a fourth stage wherein the cell-phone 3 makes an access to the MFP 102 to stop using the exclusive box.

Figure 26:
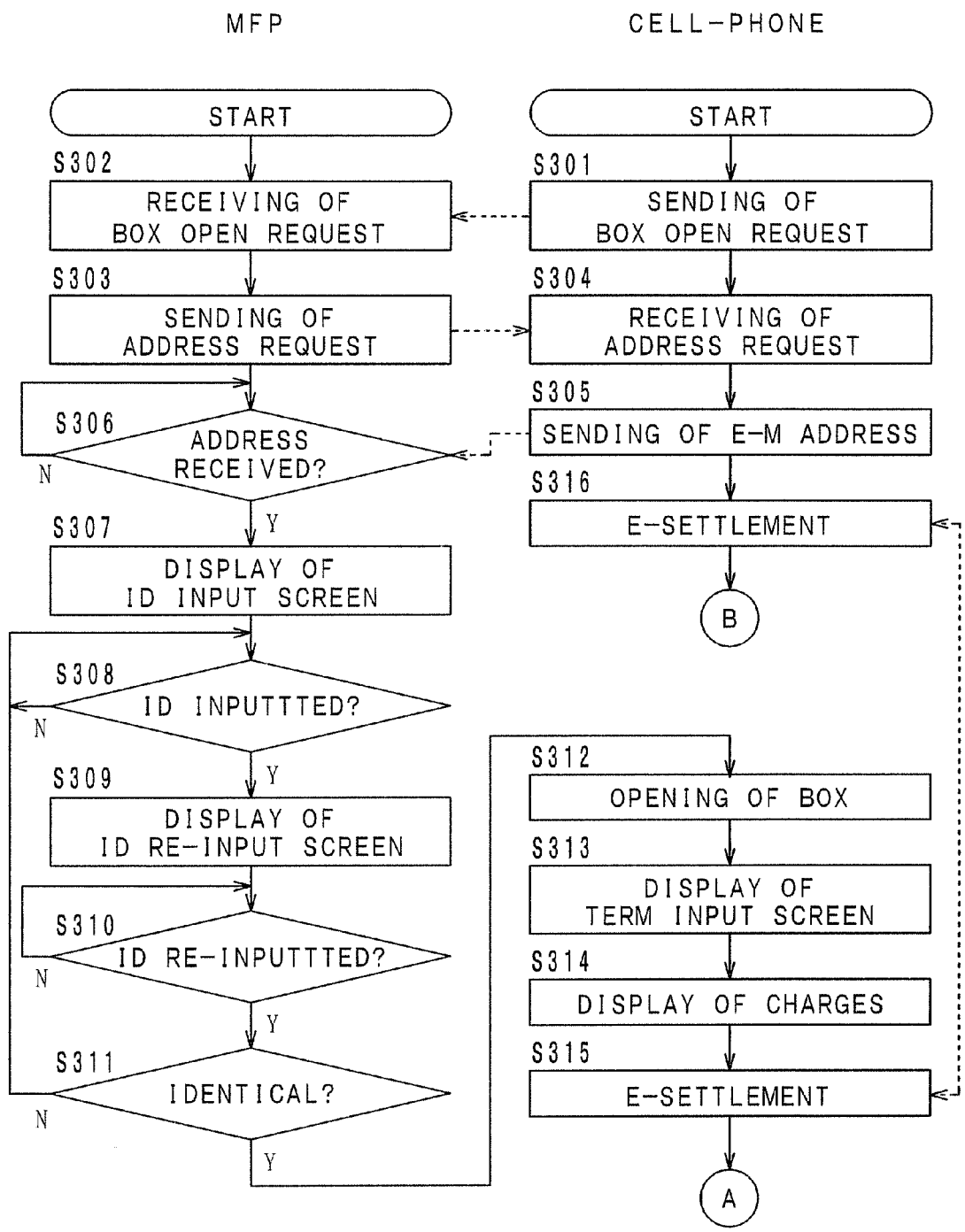
FIGS. 26 and 27 are flowcharts showing a procedure carried out by the MFP and a procedure carried out by the cell-phone at the first stage of operation according to the fourth embodiment.
Figure 27:
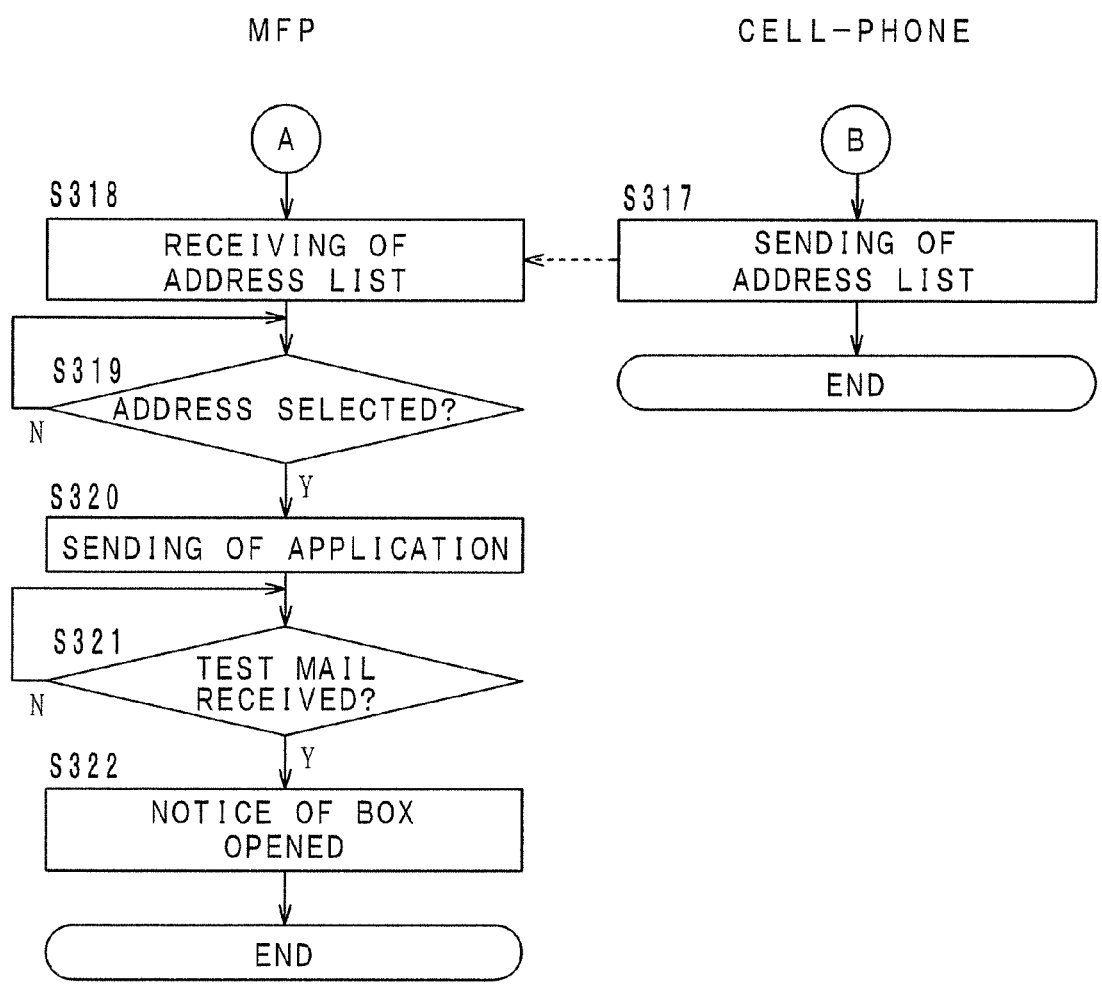
Figure 28:
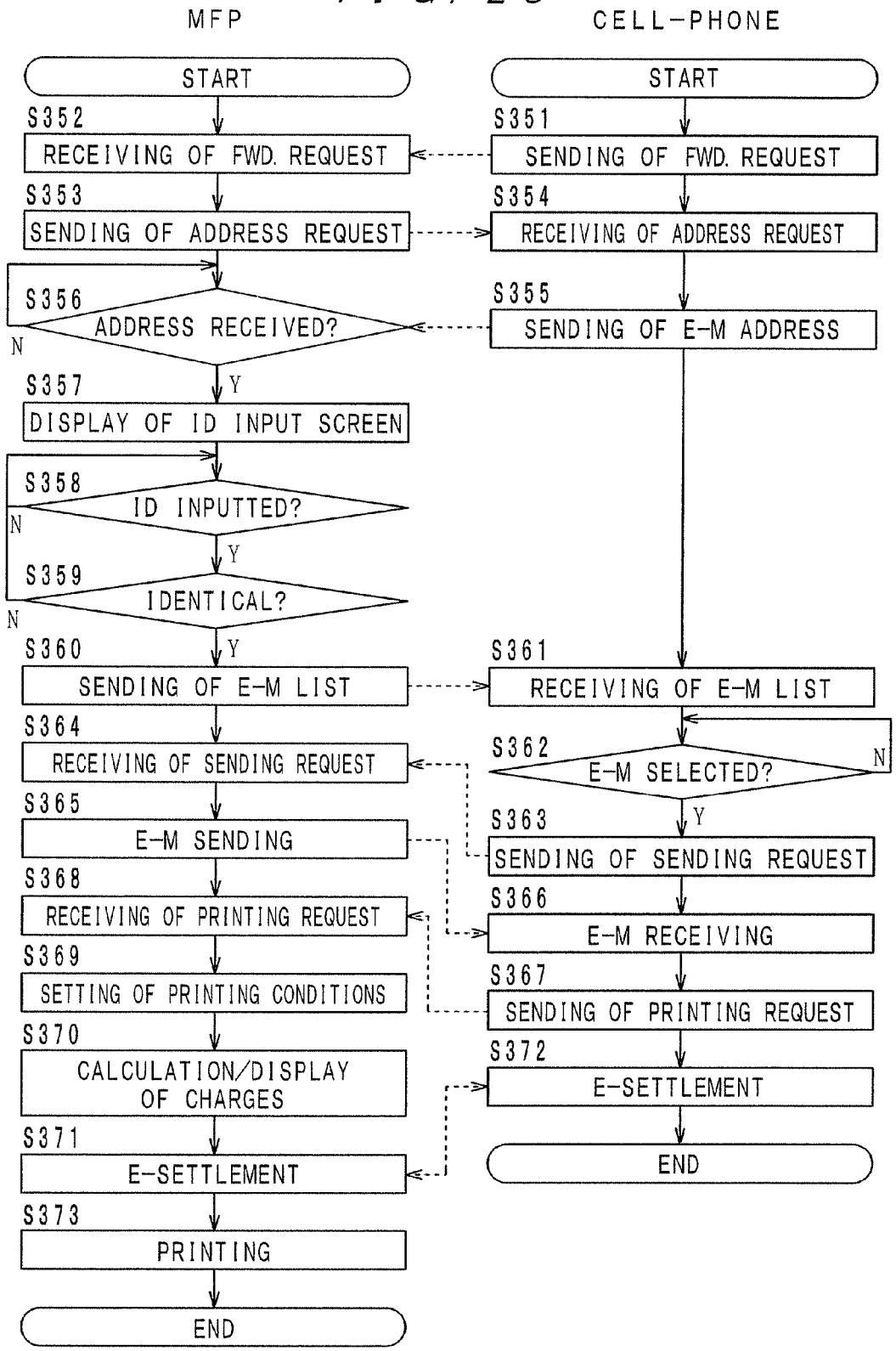
FIG. 28 is a flowchart showing a procedure carried out by the MFP and a procedure carried out by the cell-phone at the second stage of operation according to the fourth embodiment.
Figure 29:
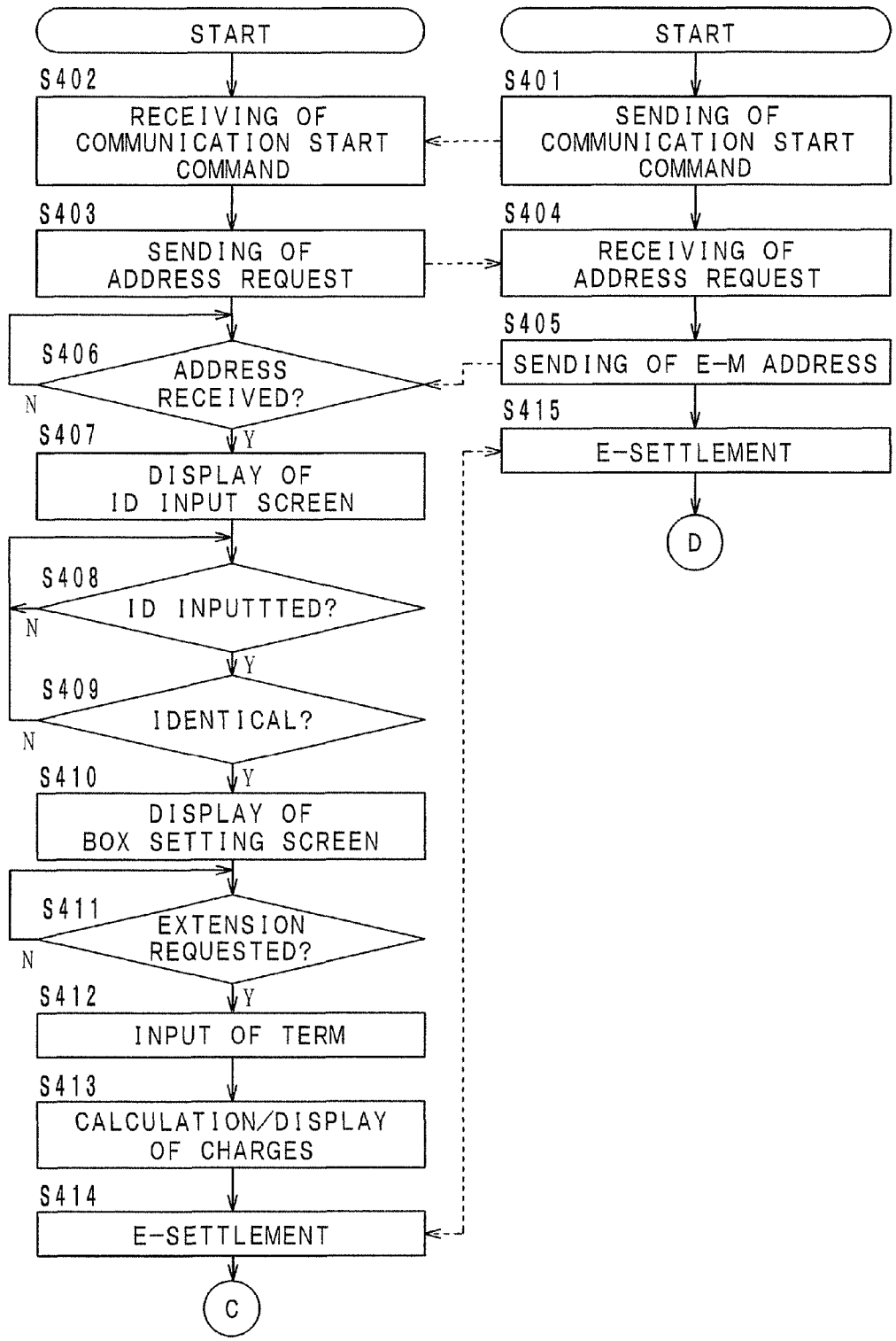
FIGS. 29 and 30 are flowcharts showing a procedure carried out by the MFP and a procedure carried out by the cell-phone at the third stage of operation according to the fourth embodiment.
Figure 30:
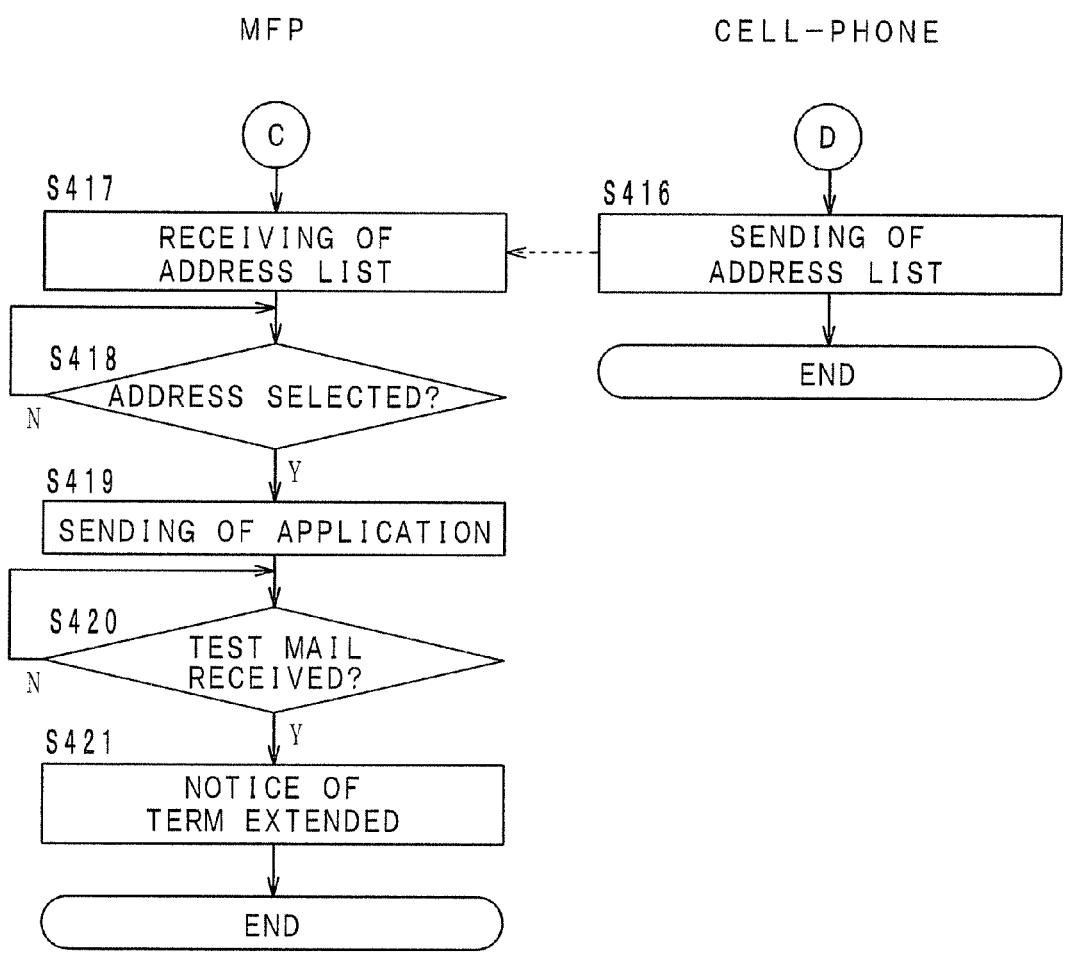

FIGS. 26 and 27 are flowcharts showing a procedure carried out by the MFP 102 and a procedure carried out by the cell-phone 3 at the first stage. FIG. 28 is a flowchart showing a procedure carried out by the MFP 102 and a procedure carried out by the cell-phone 3 at the second stage. FIGS. 29 and 30 are flowcharts showing a procedure carried out by the MFP 102 and a procedure carried out by the cell-phone 3 at the third stage. FIGS. 31 and 32 are flowcharts showing a procedure carried out by the MFP 102 and a procedure carried out by the cell-phone 3 at the fourth stage. The control sections 111, 121 and 31 of the base station 101, the MFP 102 and the PC may carry out the procedures in the flowcharts by executing software programs stored in the storage sections 112, 122 and 32 or by using hardware circuits provided for exclusive purposes.

[First Stage]

First, referring to FIGS. 26 and 27, the first stage of operation is described. The user of the cell-phone 3 operates the cell-phone 3 to send a request for opening of an exclusive box (which will be hereinafter referred to as a box open request) to the MFP 102. The control section 31 of the cell-phone 3 commands the BT communication section 35 to send a box open request to the MFP 102 (step S301). The BT communication section 125 of the MFP 102 receives the box open request (step S302).

In response to the box open request, the control section 121 of the MFP 102 commands the BT communication section 125 to send an e-mail address request to the cell-phone 3 to request the cell-phone 3 to send the e-mail address thereof (step S303). The BT communication section 35 of the cell-phone 3 receives the e-mail address request (step S304). In response to the e-mail address request, the control section 31 of the cell-phone 3 commands the BT communication section 35 to send its e-mail address to the MFP 102 (step S305).

After sending the e-mail address request, the control section 121 of the MFP 102 stands by while detecting whether the BT communication section 125 has received an e-mail address from the cell-phone 3 (step S306). When the MFP 102 has received an e-mail address, the processing goes to step S307.

When the MFP 102 has received an e-mail address, the control section 121 commands the display section 128 to display an ID input screen to promote the user to input an ID number (step S307). The user of the cell-phone 3 inputs his/her ID number by use of the input section 129. Meanwhile, the control section 121 stands by while detecting whether an input of an ID number is completed (step S308). On completion of an input of an ID number, the processing goes to step S309.

When the user has inputted his/her ID number, the control section 121 of the MFP 102 commands the display section 128 to display an ID re-input screen to promote the user to input his/her ID number again (step S309). The user of the cell-phone 3 inputs his/her ID number again by use of the input section 129. Meanwhile, the control section 121 stands by while detecting whether a re-input of an ID number has been completed (step S310). On completion of a re-input of an ID number, the processing goes to step S311.

After a re-input of an ID number, the control section 121 of the MFP 102 judges whether the ID numbers inputted at steps S308 and S310 are identical with each other (step S311). When the ID numbers are identical with each other, the processing goes to step S312. When the ID numbers are not identical with each other, the processing returns to step S308 to promote the user of the cell-phone 3 to input his/her ID number again.

When the ID numbers are identical with each other, the control section 121 of the MFP 102 opens an exclusive box for the cell-phone 3 in the storage section 122 (step S312). Next, the control section 121 commands the display section 128 to display a term input screen to promote the user to input a term of using the exclusive box (step S313). The user of the cell-phone 3 inputs a term by use of the input section 129 of the MFP 102. The control section 121 of the MFP 102 sets the inputted term as the term of using the exclusive box.

Next, the control section of the MFP 102 calculates the charges for the exclusive box and commands the display 128 to display the charges (step S314). The charges for the exclusive box are calculated based on the capacity of the box and the term of using the box. Thereafter, the cell-phone 3 and the MFP 102 carry out an electronic settlement of accounting by short-distance wireless communication with each other via the respective BT communication sections 35 and 125 (steps S315 and S316).

After the electronic settlement of accounting, the control section 31 of the cell-phone 3 commands the BT communication section 35 to send the list of e-mail addresses in the address note of the cell-phone 3 to the MFP 102 (step S317). Then, the BT communication section 125 of the MFP 102 receives the list of e-mail addresses (step S318). The control section of the MFP 102 commands the display section 128 to display the list of e-mail addresses and promotes the user to select some from the list as the senders of e-mails to be transferred to the MFP 102. In this embodiment, it is supposed that the e-mail address of the PC 104 is selected as the sender of e-mails to be transferred to the MFP 102. After commanding the display section 128 to display the list of e-mail addresses, the control section 121 stands by while detecting whether one or more e-mail addresses have been selected (step S319). When selection of one or more e-mail addresses has been completed, the processing goes to step S320.

When one or more e-mail addresses (in this embodiment, the e-mail address of the PC 104) have been selected, the control section 121 of the MFP 102 reads out the addressee changing application from the storage section 122 and commands the network communication section 127 to send the application to the selected e-mail addresses (in this embodiment, to the PC 104) (step S320). The network communication section 144 of the PC 104 receives the addressee changing application.

The control section 141 of the PC 104 activates the addressee changing application, prepares a test mail and sends the test mail to the MFP 102. The test mail is sent to the MFP 102 so that the MFP 102 can confirm that the addressee of an e-mail to be sent to the cell-phone 3 is changed to the e-mail address of the MFP 102. After sending the addressee changing application, the control section 121 of the MFP 102 stands by while detecting whether the network communication section 127 has received a test mail (step S321). When the network communication section 127 has received a test mail, the processing goes to step S322.

When the network communication section 127 has received a test mail, the control section 121 of the MFP 102 commands the display section 128 to display a screen to inform the user that an exclusive box has been opened (step S322). Thereby, the user of the cell-phone 3 knows that an exclusive box for the cell-phone 3 has been opened.ABus, the first stage has been completed.

[Second Stage]

Next, referring to FIG. 28, the second stage of operation is described. The control section 31 of the cell-phone 3 commands the BT communication section 35 to send a forwarding request to the MFP 102 so as to request the MFP 102 to send e-mails stored in the exclusive box for the cell-phone 3 (step S351). The BT communication section 125 of the MFP 102 receives the request (step S352).

After receiving the forwarding request from the cell-phone 3, the control section 121 of the MFP 102 commands the BT communication section 125 to send an e-mail address request to the cell-phone 3 (step S353). The BT communication section 35 of the cell-phone 3 receives the e-mail address request (step S354).

In response to the e-mail address request, the control section 31 of the cell-phone 3 commands the BT communication section 35 to send the e-mail address of the cell-phone 3 to the MFP 102 (step S355). Meanwhile, after sending the e-mail address request, the control section 121 of the MFP 102 stands by while detecting the BT communication section 125 has received an e-mail address (step S356). When the BT communication section 125 has received an e-mail address, the processing goes to step S357.

When the BT communication section 125 has received an e-mail address, the control section 121 of the MFP 102 commands the display section 128 to display an ID input screen to promote the user of the cell-phone 3 to input his/her ID number (step S357). The user of the cell-phone 3 inputs his/her ID, which was inputted at step S308 shown in FIG. 26, by use of the input section 129 of the MFP 102. Meanwhile, the control section 121 of the MFP 102 stands by while detecting an input of an ID number has been completed (step S358). On completion of an input of an ID number, the processing goes to step S359.

After an input of an ID number at step S358, the control section 121 of the MFP 102 judges whether the inputted ID number is identical with the ID number inputted at step S308 (step S359). When the ID numbers are identical with each other, the processing goes to step S360. When the ID numbers are not identical with each other, the processing returns to step S358 to promote the user of the cell-phone 3 to re-input his/her ID number.

When the ID numbers are identical with each other, the control section 121 of the MFP 102 commands the BT communication section 125 to send a list of e-mails stored in the exclusive box for the cell-phone 3 to the cell-phone 3 (step S360). The BT communication section 35 of the cell-phone 3 receives the list of e-mails (step S361). Further, the control section 31 of the cell-phone 3 commands the display section 36 to display the list of e-mails. The user of the cell-phone 3 selects desired e-mails from the list by use of the input section 37. Meanwhile, the control section 31 of the cell-phone 3 stands by while detecting whether the user has selected one or more e-mails (step S362). When selection of e-mails has been completed, the processing goes to step S363.

After selection of e-mails, the control section 31 of the cell-phone 3 commands the BT communication section 35 to send an e-mail sending request to the MFP 102, and the e-mail sending request includes information of the e-mails selected by the user (step S363). The BT communication section 125 receives the e-mail sending request (step S364).

After receiving the e-mail sending request, the control section 121 of the MFP 102 reads out the e-mails specified by the e-mail sending request from the exclusive box for the cell-phone 3 and sends the e-mails to the cell-phone 3 (step S365). The BT communication section 35 of the cell-phone 3 receives the e-mails (step S366). Thereby, the user of the cell-phone 3 can receive e-mails which were originally addressed to the cell-phone 3 and sent to the MFP 102. Thereafter, printing of the e-mails is carried out.

The control section 31 of the cell-phone 3 sends a printing request to the MFP 102 via the BT communication section 35 (step S367). The BT communication section 125 of the MFP 102 receives the printing request (step S368).

After receiving the printing request, the control section 121 of the MFP 102 commands the display section 128 to display a print setting screen to promote the user of the cell-phone 3 to set the printing conditions. The user of the cell-phone 3 inputs the printing conditions on the screen by use of the input section 129. The printing conditions are, for example, the number of copies, the sheet size, etc. The control section 121 of the MFP 102 sets the printing conditions of the printing section 123 in accordance with the user's inputs (step S369).

After the setting of the printing conditions, the control section 121 of the MFP 102 calculates the charges for the printing and commands the display section 128 to display the charges (step S370). The charges are calculated, for example, based on the number of copies, the sheet size, etc.

After the calculation and the display of the charges, the cell-phone 3 and the MFP 102 carry out an electronic settlement of the charges by short-distance wireless communication via the respective BT communication sections 35 and 125 (steps S371 and S372).

After the electronic settlement of the charges, the control section 121 of the MFP 102 commands the printing section 123 to print out the e-mails (step S373). Thereby, the user of the cell-phone 3 can receive printed e-mails. Thus, the second stage has completed.

[Third Stage]

Next, referring to FIGS. 29 and 30, the third stage of operation is described. First, the user of the cell-phone 3 puts the cell-phone 3 in front of the BT communication section 125 of the MFP 102. Thereby, the control section 31 of the cell-phone 3 commands the BT communication section 35 to send a communication starting command to the MFP 102 to start communication with the MFP 102 (step S401). The BT communication section 125 of the MFP 102 receives the communication starting command (step S402). Thereby, short-distance wireless communication between the cell-phone 3 and the MFP 102 has been settled.

Next, the control section 121 of the MFP 102 commands the BT communication section 125 to send an address request to the cell-phone 3 so as to request the cell-phone 3 to send its e-mail address (step S403). The BT communication section 35 of the cell-phone 3 receives the address request (step S404).

After receiving the address request, the control section 31 of the cell-phone 3 commands the BT communication section 35 to send its e-mail address to the MFP 102 (step S405). After sending the address request, the control section 121 of the MFP 102 stands by while detecting whether the BT communication section 125 has received an e-mail address from the cell-phone 3 (step S406). When the BT communication section 125 has received an e-mail address, the processing goes to step S407.

When the BT communication section 125 has received an e-mail address, the control section 121 of the MFP 102 commands the display section 128 to display an ID input screen to promote the user of the cell-phone 3 to input his/her ID number (step S407). The user of the cell-phone 3 inputs his/her ID number, which was inputted at step S308 shown in FIG. 26, by use of the input section 129 of the MFP 102. After displaying the ID input screen, the control section 121 of the MFP 102 stands by while detecting an input of an ID number has been completed (step S408). When an input of an ID number has been completed, the processing goes to step S409.

On completion of an input of an ID number, the control section 121 of the MFP 102 judges whether the ID number inputted at step S308 and the ID number inputted at step S408 are identical with each other (step S409). When the ID numbers are identical with each other, the processing goes to step S410. When the ID numbers are not identical with each other, the processing returns to step S408 to promote the user to input his/her ID number again.

When the ID numbers are identical with each other, the control section 121 of the MFP 102 commands the display section 128 to display a box setting screen (step S410). The box setting screen is to change the settings of the exclusive box, for example, to change the term of using the exclusive box, the capacity of the exclusive box, etc. The user of the cell-phone 3 operates the input section 129 to make an input on the screen to make a request for extension of the term of using the exclusive box. Meanwhile, the control section 121 of the MFP 102 stands by while detecting whether the user has made a request for extension of the term of using the exclusive box (step S411). When a request for extension of the term has been made, the processing goes to step S412.

When a request for extension of the term is made, the control section 121 of the MFP 102 commands the display section 128 to display a term extension screen. The user of the cell-phone 3 operates the input section 129 to input a desired term on the screen. On completion of the input, the control section 121 of the MFP 102 stores the inputted term in the storage section 122 as a newly set term of using the exclusive box (step S412). Thus, a change in the term of using the exclusive box is made.

Next, the control section of the MFP 102 calculates the charges for the use of the exclusive box for the extended term and commands the display 128 to display the charges (step S413). Thereafter, the cell-phone 3 and the MFP 102 carry out an electronic settlement of the charges by short-distance wireless communication via the BT communication sections 35 and 125 (steps S414 and S415).

On completion of the electronic settlement, the control section 31 of the cell-phone 3 reads out a list of e-mail addresses from the address note stored in the storage section 32 of the cell-phone 3 and commands the BT communication section 35 to send the list of e-mail addresses to the MFP 102 (step S416). The BT communication section 125 of the MFP 102 receives the list of e-mails (step S417).

After receiving the list of e-mails, the control section 121 of the MFP 102 commands the display 128 to display the list of e-mail addresses to promote the user of the cell-phone 3 to select one or more e-mail addresses from the list as the senders of e-mails to be transferred to the MFP 102. In this embodiment, it is supposed that the e-mail address of the PC 104 has been selected. Meanwhile, the control section 121 of the MFP 102 stands by while detecting one or more e-mails have been selected (step S418). When selection of one or more e-mail addresses is completed, the processing goes to step S419.

After the selection of e-mail addresses, the control section 121 of the MFP 102 reads out the addressee changing application from the storage section 122 and commands the network communication section 127 to send the addressee changing application to the PC 104 (step S419). The network communication section 144 of the PC 104 receives the addressee changing application.

The control section 141 of the PC 104 activates the addressee changing application and makes a test mail. Then, the control section 141 sends the test mail to the MFP 102 via internet. The MFP 102 confirms by the test mail that the addressee of an e-mail to be sent to the cell-phone 3 is changed to the e-mail address to the MFP 2. After sending the addressee changing application, the MFP 102 stands by while detecting whether the network communication section 127 has received a test mail (step S420). When the network communication section 127 has received a test mail, the processing goes to step S421.

When the network communication section 127 has received a test mail, the control section of the MFP 102 commands the display section 128 to display a screen to notify the user that a procedure for an extension of the term of using the exclusive box has been completed (step S421). Thereby, the user of the cell-pone 3 confirms that the term of using the exclusive box has been extended. Then, the third stage has been completed.

[Fourth Stage]

Next, referring to FIGS. 31 and 32, the fourth stage is described. The processes carried out by the MFP 102 and the cell-phone 3 at steps S451 to S460 in the fourth stage are the same as the processes carried out by the MFP 102 and the cell-phone 3 at steps S401 to S410 in the third stage. Therefore, descriptions of these processes are omitted.

When the box setting screen is displayed at step S460, the user of the cell-phone 3 operates the input section 129 to make a request for termination of the use of the exclusive box. After displaying the box setting screen, the control section 121 of the MFP 102 stands by while detecting whether a request for termination of the use of the exclusive box has been made (step S461). When a request for termination of the use of the exclusive box has been made, the processing goes to step S462.

When a request for termination of the use of the exclusive box has been made, the control section 121 of the MFP 102 commands the display section 128 to display a box closing screen (step S462). Then, at step S463 to S476, the MFP 102 sends e-mails which have not been sent to the cell-phone 3. The processes carried out by the MFP 102 and the cell-phone 3 at step S463 to S476 are the same as the processes carried out by the MFP 102 and the cell-phone 3 at steps S360 to S373 shown in FIG. 28, and descriptions of these processes are omitted.

On completion of the process at step S476 for printing of e-mails, the control section 121 of the MFP 102 deletes the exclusive box for the cell-phone 3 (step S477). Thus, the e-mail transfer service according to the inventive communication system is completed.

As described above, in the communication system according to the fourth embodiment, while the user of the cell-phone 3 stays in a non-service area, e-mails sent from designated e-mail addresses to the cell-phone 3 are transferred to the MFP 102 located in the non-service area. Therefore, the user of the cell-phone 3 can receive the e-mails from the MFP 2 without returning to a service area.

In the first through fourth embodiments, instead of the cell-phone 3, a portable communication tool with a radio communication section, such as a PDA, may be used.

In the first through fourth embodiments, the MFP 2 or 102 is used as the image processing apparatus. However, the image processing apparatus is not limited to the MFP 2 or 102. As long as the image processing apparatus is connected and communicable with the base station 1 or 10 by a cable and is communicable with the cell-phone 3, the image processing apparatus may be a copying machine, a printer, a facsimile or the like.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A communication system comprising a radio communication terminal, a base station communicable with said radio communication terminal by radio wave and a plural number of image processing apparatuses connected to said base station by cables to be communicable with said base station, wherein:

said base station comprises:
- a storage section that is stored with electronic data and transfer destination information regarding said plural number of image processing apparatuses connected to said base station;
- a condition detecting section for detecting a communication condition between said base station and said radio communication terminal;
- a first sending section for sending the electronic data which is addressed to said radio communication terminal from the storage section to said radio communication terminal,
- a second sending section for sending the transfer destination information to said radio communication terminal when the condition detecting section detects the communication condition become in a bad state while the first sending section of the base station is sending the electronic data to the radio communication terminal, each of said plural number of image processing apparatuses comprises:
- a first receiving section for receiving the electronic data addressed to said radio communication terminal from said base station;
- a storage section for storing the received electronic data therein; and
- a first sending section for sending the electronic data from the storage section to said radio communication terminal, and said radio communication terminal comprises:
- a first receiving section for receiving the electronic data addressed to itself from said base station;
- a second receiving section for receiving the transfer destination information from said base station when the condition detecting section detects the communication condition become in a bad state while the first sending section of the base station is sending the electronic data to the radio communication terminal; and
- a sending section for sending a data transfer request to the base station when the condition detecting section detects the communication condition become in a bad state while the first sending section of the base station is sending the electronic data to the radio communication terminal, to request a data transfer of the electronic data addressed to said radio communication terminal to one of the image processing apparatuses shown by the received transfer destination information, wherein said first sending section of the base station sends the electronic data addressed to the radio communication terminal to one of the image processing apparatuses based on the data transfer request sent from the radio communication terminal, and said first sending section of the image processing apparatus which receives the electronic data from the base station sends the received electronic data to said radio communication terminal.

2. A communication system according to claim 1, wherein:

said radio communication terminal further comprises:
- a selection section for permitting a user to select one from said image processing apparatuses shown by the received transfer destination information; and the data transfer request sent from the sending section of said radio communication terminal to said base station includes information on the image processing apparatus selected by the user.

3. A communication system according to claim 2, wherein the transfer destination information includes information on locations of said image processing apparatuses.

4. A communication system according to claim 3, wherein:
said radio communication terminal further comprises a position information receiving section for receiving position information on a current position of itself from an artificial satellite;
the sending section of said radio communication terminal sends the position information to said base station;
the receiving section of said base station receives the position information on the current position of said radio communication terminal;
said base station further comprises a specifying section for specifying some of said image processing apparatuses which are located within a specified range of the current position of said radio communication terminal; and
the second sending section of said base station sends the transfer destination information including information on the image processing apparatuses specified by the specifying section to the radio communication terminal.

5. A communication system according to claim 4, wherein:
the storage section of said base station is further stored with map data;
said base station further comprises a searching section for searching the map data for an area around the current position of said radio communication terminal;
the specifying section of said base station specifies some of said image processing apparatuses located in the searched area; and
the second sending section of said base station sends map data on the searched area to said radio communication terminal together with the transfer destination information.

6. A communication system according to claim 5, wherein:
said base station further comprises a composing section for marking the locations of the image processing apparatuses specified by the specifying section in the area map data searched by the searching section to make composite map data;
the second sending section of said base station sends the composite map data to said radio communication terminal.

7. A communication system according to claim 3, wherein:
said radio communication terminal further comprises an input section for receiving an input from a user;
the sending section of said radio communication terminal sends position information inputted by the user to said base station;
the receiving section of said base station receives the inputted position information;
said base station further comprises a specifying section for specifying some of said image processing apparatuses which are located within a specified range from a position shown by the inputted position information; and
the second sending section of said base station send the transfer destination information on the image processing apparatuses specified by the specifying section.

8. A communication system according to claim 1, wherein the transfer destination information includes information on locations of said image processing apparatuses.

9. A communication system according to claim 8, wherein:
said radio communication terminal further comprises a position information receiving section for receiving position information on a current position of itself from an artificial satellite;
the sending section of said radio communication terminal sends the position information to said base station;
the receiving section of said base station receives the position information on the current position of said communication terminal;
said base station further comprises a specifying section for specifying some of said image processing apparatuses which are located within a specified range of the current position of said radio communication terminal; and
the second sending section of said base station sends the transfer destination information on the image processing apparatus specified by the specifying section to the radio communication terminal.

10. A communication system according to claim 9, wherein:
the storage section of said base station is further stored with map data;
said base station further comprises a searching section for searching the map data for an area around the current position of said radio communication terminal;
the specifying section of said base station specifies some of said image processing apparatuses located in the searched area; and
the second sending section of said base station sends map data on the searched area to said radio communication terminal together with the transfer destination information.

11. A communication system according to claim 10, wherein:
said base station further comprises a composing section for marking the locations of the image processing apparatuses specified by the specifying section in the area map data searched by the searching section to make composite map data; and
the second sending section of said base station sends the composite map data to said radio communication terminal.

12. A communication system according to claim 8, wherein:
said radio communication terminal further comprises an input section for receiving an input from a user;
the sending section of said radio communication terminal sends position information inputted by the user to said base station;
the receiving section of said base station receives the inputted position information;
said base station further comprises a specifying section for specifying some of said image processing apparatuses which are located within a specified range from a position shown by the inputted position information; and
the second sending section of said base station sends the transfer destination information on the image processing apparatuses specified by the specifying section.

13. A communication system according to claim 1, wherein:
the sending section of said radio communication terminal sends the data transfer request to one of said image processing apparatuses;
each of said image processing apparatuses further comprises:
a second receiving section for receiving the data transfer request; and
a second sending section for, when receiving the data transfer request, sending the data transfer request to said base station;
the receiving section of said base station receives the data transfer request; and the first sending section of said base station sends the electronic data to the image processing apparatus which sent the data transfer request.

14. A communication method in a communication system comprising a radio communication terminal, a base station communicable with said radio communication terminal by radio wave and a plural number of image processing apparatuses connected to said base station by cables to be communicable with said base station, said communication method comprising:

a step wherein said base station sends transfer destination information to said radio communication terminal when detecting a communication condition becomes in a bad state while sending electronic data addressed to said radio communication terminal to said radio communication terminal;

a step wherein said radio communication terminal receives the transfer destination information when detecting a communication condition becomes in a bad state while sending electronic data addressed to said radio communication terminal to said radio communication terminal;

a step wherein said radio communication terminal sends a data transfer request to said base station when detecting a communication condition becomes in a bad state while sending electronic data addressed to said radio communication terminal to said radio communication terminal, to request a data transfer of the electronic data addressed to said radio communication terminal to one of the image processing apparatuses shown by the received transfer destination information;

a step wherein said base station receives the data transfer request;

a step wherein said base station sends the electronic data addressed to said radio communication terminal to one of said image processing apparatuses based on the data transfer request sent from the radio communication terminal;

a step wherein the one of said image processing apparatuses receives, from said base station, the electronic data addressed to said radio communication terminal;

a step wherein the one of said image processing apparatuses stores, therein, the electronic data addressed to said radio communication terminal; and a step wherein the one of said image processing apparatuses sends the electronic data addressed to said radio communication terminal to said radio communication terminal.

* * * * *